United States Patent
Wang et al.

(10) Patent No.: US 10,397,884 B2
(45) Date of Patent: Aug. 27, 2019

(54) POWER DETERMINING METHOD AND USER EQUIPMENT

(71) Applicant: HUAWEI TECHNOLOGIES CO., LTD., Shenzhen (CN)

(72) Inventors: Ting Wang, Shanghai (CN); Yuanjie Li, Shanghai (CN); Jian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/996,478

(22) Filed: Jun. 3, 2018

(65) Prior Publication Data

US 2018/0279233 A1 Sep. 27, 2018

Related U.S. Application Data

(63) Continuation of application No. PCT/CN2016/108428, filed on Dec. 2, 2016.

(30) Foreign Application Priority Data

Dec. 3, 2015 (CN) .......................... 2015 1 0883375

(51) Int. Cl.
*H04W 52/36* (2009.01)
*H04W 52/06* (2009.01)
(Continued)

(52) U.S. Cl.
CPC ........... *H04W 52/36* (2013.01); *H04W 52/06* (2013.01); *H04W 52/367* (2013.01);
(Continued)

(58) Field of Classification Search
USPC ........................................... 455/522, 69–70
See application file for complete search history.

(56) References Cited

U.S. PATENT DOCUMENTS

| | | | |
|---|---|---|---|
| 2010/0103867 A1* | 4/2010 | Kishiyama | H04W 52/04 370/320 |
| 2011/0319120 A1 | 12/2011 | Chen et al. | |

(Continued)

FOREIGN PATENT DOCUMENTS

| | | |
|---|---|---|
| CN | 101466138 A | 6/2009 |
| CN | 102137499 A | 7/2011 |

(Continued)

OTHER PUBLICATIONS

3GPP TS 36.211 V12.7.0 (Sep. 2015);3rd Generation Partnership Project;Technical Specification Group Radio Access Network;Evolved Universal Terestrial Radio Access (E-UTRA);Physical channels and modulation(Release 12),total 136 pages.

(Continued)

*Primary Examiner* — Fayyaz Alam
(74) *Attorney, Agent, or Firm* — Kilpatrick Townsend & Stockton, LLP

(57) ABSTRACT

The application provides a method for power determining. UE is configured with multiple cells, a first subframe of a first cell corresponds to multiple second subframes of a second cell, and the method includes: calculating a first power requirement on the first subframe, and calculating multiple second power requirements on the multiple second subframes; calculating a power indicator on the multiple second subframes according to the multiple second power requirements; and determining transmit powers on the first subframe and the multiple second subframes according to a magnitude relationship between a maximum transmit power and a sum of the first power requirement and the power indicator. In the application, the power indicator is determined for multiple subframes of the second cell.

16 Claims, 11 Drawing Sheets

(51) Int. Cl.
*H04W 52/26* (2009.01)
*H04W 52/28* (2009.01)
*H04W 88/02* (2009.01)

(52) U.S. Cl.
CPC ........ *H04W 52/267* (2013.01); *H04W 52/281* (2013.01); *H04W 88/02* (2013.01)

(56) References Cited

U.S. PATENT DOCUMENTS

| | | | | |
|---|---|---|---|---|
| 2013/0142098 | A1* | 6/2013 | Kwon | H04W 52/04 370/311 |
| 2014/0133449 | A1 | 5/2014 | Xu et al. | |
| 2014/0314014 | A1 | 10/2014 | Zhang et al. | |
| 2014/0321392 | A1* | 10/2014 | Li | H04W 52/325 370/329 |
| 2014/0329555 | A1 | 11/2014 | Gao et al. | |
| 2016/0183195 | A1 | 6/2016 | Gao et al. | |
| 2016/0270006 | A1* | 9/2016 | Choi | H04W 16/32 |
| 2016/0381644 | A1* | 12/2016 | Forrester | H04W 52/146 370/311 |
| 2017/0086148 | A1* | 3/2017 | Jung | H04W 52/262 |
| 2017/0188311 | A1* | 6/2017 | Hwang | H04W 52/146 |
| 2018/0279376 | A1* | 9/2018 | Dinan | H04W 74/0833 |

FOREIGN PATENT DOCUMENTS

| | | |
|---|---|---|
| CN | 102573030 A | 7/2012 |
| CN | 103200662 A | 7/2013 |
| CN | 104349443 A | 2/2015 |
| WO | 2013016855 A1 | 2/2013 |
| WO | 2015122695 A1 | 8/2015 |
| WO | 2015156486 A1 | 10/2015 |

OTHER PUBLICATIONS

3GPP TS 36.101 V13.1.0 (Oct. 2015);3rd Generation Partnership Project;Technical Specification Group Radio Access Network;Evolved Universal Terrestrial Radio Access (E-UTRA);User Equipment (UE) radio transmission and reception (Release 13),total 762 pages.

3GPP TS 36.213 V12.7.0 (Sep. 2015);3rd Generation Partnership Project;Technical Specification Group Radio Access Network;Evolved Universal Terrestrial Radio Access (E-UTRA);Physical layer procedures(Release 12),total 241 pages.

RWS-150008 Panasonic, "View on RAT and IMT-2020", 3GPP RAN workshop on 5G, Phoenix, AZ; USA, Sep. 17-18, 2015, total 12 pages.

RWS-150051, NTT DOCOMO INC., "5G Vision for 2020 and Beyond", 3GPP RAN workshop an 5G, Phoenix, AZ, USA, Sep. 17-18, 2015, total 23 pages.

* cited by examiner

POWER DETERMINING METHOD AND USER EQUIPMENT

CROSS-REFERENCE TO RELATED APPLICATIONS

This disclosure is a continuation of International Application No. PCT/CN2016/108428, filed on Dec. 2, 2016, which claims priority to Chinese Patent Application No. 201510883375.1, filed on Dec. 3, 2015. The disclosures of the aforementioned applications are hereby incorporated by reference in their entireties.

TECHNICAL FIELD

The present disclosure relates to the communications field, and more specifically, to a power determining method and user equipment.

BACKGROUND

Currently, as requirements for a data transmission rate, communication quality, and the like of mobile communication are becoming higher, an existing frequency band used for mobile communication has become quite crowded. With rapid development of a packet service and an intelligent terminal, a service of a high speed and a large data volume has an increasing requirement for a spectrum. A centimeter wave (centimeter wave) frequency band generally refers to a spectrum ranging from 3 GHz to 30 GHz, and a millimeter wave (mmWave) frequency band generally refers to a spectrum ranging from 3 GHz to 300 GHz. Alternatively, a spectrum ranging from 3 GHz to 300 GHz may be collectively referred to as a millimeter wave frequency band.

On the millimeter wave frequency band from 3 GHz to 300 GHz, a large quantity of spectrum resources are still not allocated for use. Therefore, a large quantity of available bandwidth of the millimeter wave frequency band is a potential target spectrum for future development of 5G communications and the 3rd Generation Partnership Project (3rd Generation Partnership Project, 3GPP) Long Term Evolution Advanced (Long Term Evolution Advanced, LTE-A).

In a future millimeter wave or low latency system, because a relatively short frame structure is used in a channel characteristic and a latency requirement, a symbol length is also reduced. Therefore, in a scenario in which UE is configured with multiple cells (or carriers), such as carrier aggregation (CA) or dual connectivity (DC), a subframe of a carrier corresponds to multiple subframes of another carrier. In existing power control, frame structures of carriers are the same, and consequently a problem of power control in different frame structures cannot be resolved.

SUMMARY

This disclosure provides a power determining method for a case in which one subframe of a cell corresponds to multiple subframes of another cell, so that it can be ensured that an overall transmission power is not greater than a maximum transmit power of user equipment, and communication quality can be ensured.

According to a first aspect, a power determining method is provided, where UE is configured with multiple cells, a first subframe of a first cell corresponds to N second subframes of a second cell, and the method includes:

calculating, by the UE, a first power requirement on the first subframe, and calculating N second power requirements on the N second subframes;

calculating, by the UE, a power indicator on the N second subframes according to the N second power requirements; and determining, by the UE, transmit powers on the first subframe and the N second subframes according to a magnitude relationship between a maximum transmit power and a sum of the first power requirement and the power indicator, where N is a positive integer greater than 1.

Optionally, the first subframe is denoted as a subframe i, the N second subframes are denoted as subframes i1, i2, ..., and iN, the first power requirement is denoted as $P_{req\_c1}(i)$, the second power requirement is denoted as $P_{req\_c2}(ij)$, the maximum transmit power corresponding to the first subframe i is denoted as $P_{MAX}(i)$, and a value range of j is 1 to N.

In the embodiments of this disclosure, the power indicator is determined for multiple subframes of the second cell. When the sum of the first power requirement and the power indicator is greater than the maximum transmit power, the first power requirement and/or the second power requirement are/is adjusted, so as to ensure that an overall transmission power is not greater than the maximum transmit power, so that transmission efficiency can be ensured.

With reference to the first aspect, in a first possible implementation of the first aspect, if at least one second subframe of the N second subframes transmits a PRACH, $P_{req\_c2}(ik)=P_{PUCCH,c2}(ik)+P_{PUSCH,c2}(ik)$, and $P_{req\_c2}(ix)=P_{PRACH,c2}(ix)$, where ik represents a sequence number of a second subframe that is of the N second subframes and that does not transmit a PRACH, and ix represents a sequence number of a second subframe that transmits a PRACH.

The calculating a power indicator on the N second subframes according to the N second power requirements includes:

denoting the power indicator as $P_{PRACH,c2}(i)$, and $P_{PRACH,c2}(i)=\max\{P_{PUCCH,c2}(ik)+P_{PUSCH,c2}(ik), P_{PRACH,c2}(ix)\}$, or $P_{PRACH,c2}(i)=\min\{P_{PUCCH,c2}(ik)+P_{PUSCH,c2}(ik), P_{PRACH,c2}(ix)\}$, or $P_{PRACH,c2}(i)=\gamma_{c2}(ik)\times(P_{PUCCH,c2}(ik)+P_{PUSCH,c2}(ik))+\gamma_{c2}(ix)\times P_{PRACH,c2}(ix)$, or $P_{PRACH,c2}(i)=\max\{P_{PRACH,c2}(ix)\}$, or $P_{PRACH,c2}(i)=\min\{P_{PRACH,c2}(ix)\}$, where max represents using a maximum value, min represents using a minimum value, $\gamma_{c2}(ik)$ represents a scaling factor of a second subframe ij, and $0 \leq \gamma_{c2}(ij) \leq 1$.

If the first subframe transmits a PRACH, the determining transmit powers on the first subframe and the N second subframes includes:

if $P_{req\_c1}(i)+P_{PRACH,c2}(i)>P_{MAX}(i)$, and $P_{req\_c1}(i)+P_{PRACH,c2}(ix) \leq P_{MAX}(i)$, using the first power requirement as a transmit power on the first subframe, using $P_{PRACH,c2}(ix)$ as a transmit power on a second subframe ix, using $w_{c2,1}(ik) \times P_{PUCCH,c2}(ik)$ as a transmit power for transmitting a PUCCH on a second subframe ik, and using $w_{c2,2}(ik) \times P_{PUSCH,c2}(ik)$ as a transmit power for transmitting a PUSCH on the second subframe ik, so that $w_{c2,1}(ik) \times P_{PUCCH,c2}(ik)+w_{c2,2}(ik) \times P_{PUSCH,c2}(ik) \leq P_{PRACH,c2}(ix)$, where $0 \leq w_{c2,1}(ik) \leq 1$, and $0 \leq w_{c2,2}(ik) \leq 1$; or if $P_{req\_c1}(i)+P_{PRACH,c2}(i)>P_{MAX}(i)$, and $P_{req\_c1}(i)+P_{PRACH,c2}(ix)>P_{MAX}(i)$, using $w_{c1,1}(i) \times P_{req\_c1}(i)$ as a transmit power on the first subframe i, and using $w_{c2,3}(ix) \times P_{PRACH,c2}(ix)$ as a transmit power on a second subframe ix, so that $w_{c1,1}(i) \times P_{req\_c1}(i)+w_{c2,3}(ix) \times P_{PRACH,c2}(ix) \leq P_{MAX}(i)$, where $0 \leq w_{c1,1}(i) \leq 1$, and $0 \leq w_{c2,3}(ix) \leq 1$.

If the first subframe transmits a physical uplink control channel PUCCH and/or a physical uplink shared channel PUSCH, the determining transmit powers on the first subframe and the N second subframes includes:

if $P_{req\_c1}(i)+P_{PRACH,c2}(i)>P_{MAX}(i)$, using $w_{c1,2}(i)\times P_{req\_c1}(i)$ as a transmit power on the first subframe i, and separately using the N second power requirements as transmit powers on the N second subframes, so that $w_{c1,2}(i)\times P_{req\_c1}(i)+P_{PRACH,c2}(ix)\leq P_{MAX}(i)$, where $0\leq w_{c1,2}(i)<1$.

In this way, if a subframe of the second cell transmits a PRACH, a PRACH power indicator may be determined, and therefore transmit powers on the first cell and the second cell are determined, so that transmission efficiency can be ensured.

With reference to the first aspect, in a second possible implementation of the first aspect, if at least one second subframe of the N second subframes transmits a PUCCH and/or a PUSCH, $P_{req\_c2}(ij)=P_{PUCCH,c2}(ij)+P_{PUSCH,c2}(ij)$.

Optionally, the power indicator on the N second subframes may be calculated in the following manner:

denoting the power indicator as $P_{req\_c2}(i)$, and calculating the power indicator by using the following formula: $P_{req\_c2}(i)=P_{PUCCH,c2}(i)+P_{PUSCH,c2}(i)$, where $P_{PUCCH,c2}(i)$ represents a PUCCH power indicator on the N second subframes;

$P_{PUCCH,c2}(i)=\max\{P_{PUCCH,c2}(i1),P_{PUCCH,c2}(i2),\ldots,P_{PUCCH,c2}(iN)\}$; or $P_{PUCCH,c2}(i)=\min\{P_{PUCCH,c2}(i1),P_{PUCCH,c2}(i2),\ldots,P_{PUCCH,c2}(iN)\}$; or $P_{PUCCH,c2}(i)=\alpha\times(P_{PUCCH,c2}(i1)+P_{PUCCH,c2}(i2)+\ldots+P_{PUCCH,c2}(iN))$; and $P_{PUSCH,c2}(i)$ represents a PUSCH power indicator on the N second subframes;

$P_{PUSCH,c2}(i)=\max\{P_{PUSCH,c2}(i1),P_{PUSCH,c2}(i2),\ldots,P_{PUSCH,c2}(iN)\}$; or $P_{PUSCH,c2}(i)=\min\{P_{PUSCH,c2}(i1),P_{PUSCH,c2}(i2),\ldots,P_{PUSCH,c2}(iN)\}$; or $P_{PUSCH,c2}(i)=\alpha\times(P_{PUSCH,c2}(i1)+P_{PUSCH,c2}(i2)+\ldots+P_{PUSCH,c2}(iN))$, where max represents using a maximum value, min represents using a minimum value, $\alpha$ is a power parameter, and the power parameter is preconfigured or the power parameter is pre-obtained by the UE from a base station.

Optionally, the power indicator on the N second subframes may be calculated in the following manner:

the calculating a power indicator on the N second subframes according to the N second power requirements includes:

denoting the power indicator as $P_{req\_c2}(i)$, and calculating the power indicator by using the following formula:

$P_{req\_c2}(i)=\max\{P_{req\_c2}(i1),P_{req\_c2}(i2),\ldots,P_{req\_c2}(iN)\}$; or $P_{req\_c2}(i)=\min\{P_{req\_c2}(i1),P_{req\_c2}(i2),\ldots,P_{req\_c2}(iN)\}$; or $P_{req\_c2}(i)=\alpha\times(P_{req\_c2}(i1)+P_{req\_c2}(i2)+\ldots+P_{req\_c2}(iN))$, where max represents using a maximum value, min represents using a minimum value, $\alpha$ is a power parameter, and the power parameter is preconfigured or the power parameter is pre-obtained by the UE from a base station.

If the first subframe transmits a PRACH, the determining transmit powers on the first subframe and the N second subframes includes:

if $P_{req\_c1}(i)+P_{req\_c2}(i)>P_{MAX}(i)$, using $P_{req\_c1}(i)$ as a transmit power on the first subframe i, and using $w_{c2,4}(ij)\times P_{req\_c2}(ij)$ as a transmit power on a second subframe ij, so that $P_{req\_c1}(i)+w_{c2,4}(ij)\times P_{req\_c2}(i)\leq P_{MAX}(i)$, where $0\leq w_{c2,4}(ij)<1$.

If the first subframe transmits a PUCCH and/or a PUSCH, the determining transmit powers on the first subframe and the N second subframes includes: when $P_{req\_c1}(i)+P_{req\_c2}(i)\leq P_{MAX}(i)$, using $P_{req\_c1}(i)$ as a transmit power on the first subframe i, and using $\min\{P_{req\_c2}(ij),P_{req\_c2}(i)\}$ as a transmit power on a second subframe ij.

If the first subframe transmits a PUCCH, and at least one second subframe of the N second subframes transmits a PUCCH, the determining transmit powers on the first subframe and the N second subframes includes:

when $P_{req\_c1}(i)+P_{req\_c2}(i)>P_{MAX}(i)$, using $w_{c1,3}(i)\times P_{req\_c1}(i)$ as a transmit power on the first subframe i, and using $\min\{P_{req\_c2}(ij),w_{c2,5}(i)\times P_{req\_c2}(i)\}$ as a transmit power on a second subframe ij, so that $w_{c1,3}(i)\times P_{req\_c1}(i)+w_{c2,5}(i)\times P_{req\_c2}(i)\leq P_{MAX}(i)$, where $0\leq w_{c1,3}(i)<1$, and $0\leq w_{c2,5}(i)<1$.

If the first subframe transmits a PUCCH and/or a PUSCH, the determining transmit powers on the first subframe and the N second subframes includes:

when $P_{req\_c1}(i)+P_{req\_c2}(i)>P_{MAX}(i)$, using $P_{PUCCH,c1}(i)$ as a PUCCH transmit power on the first subframe i, using $P_{PUCCH,c2}(ij)$ as a PUCCH transmit power on a second subframe ij, using $w_{c1,4}(i)\times P_{PUSCH,c1}(i)$ as a PUSCH transmit power on the first subframe i, and using $\min\{P_{PUSCH,c2}(ij),w_{c2,6}(i)\times P_{PUSCH,c2}(i)+\max\{P_{PUCCH,c1}(i),P_{PUCCH,c2}(ij)\}-P_{PUCCH,c2}(ij)\}$ as a PUSCH transmit power on the second subframe ij, so that $w_{c1,4}(i)\times P_{PUSCH,c1}(i)+w_{c2,6}(i)\times P_{PUSCH,c2}(i)\leq P_{MAX}(i)-P_{PUCCH,c1}(i)-P_{PUCCH,c2}(ij)$, where $0<w_{c1,4}(i)<1$, and $0\leq w_{c2,6}(i)<1$.

If the first subframe transmits a PUSCH that carries UCI, and a PUSCH transmitted by the N second subframes does not carry UCI, the determining transmit powers on the first subframe and the N second subframes includes:

when $P_{req\_c1}(i)+P_{req\_c2}(i)>P_{MAX}(i)$, using $P_{req\_c1}(i)$ as a transmit power on the first subframe i, using $P_{PUCCH,c2}(ij)$ as a PUCCH transmit power on a second subframe ij, and using $\min\{P_{PUSCH,c2}(ij),w_{c2,7}(i)\times P_{PUSCH,c2}(i)+\max\{P_{PUCCH,c2}(i),P_{PUCCH,c2}(ij)\}-P_{PUCCH,c2}(ij)\}$ as a PUSCH transmit power on the second subframe ij, so that $w_{c2,7}(i)\times P_{PUSCH,c2}(i)\leq P_{MAX}(i)-P_{PUCCH,c1}(i)-P_{PUCCH,c2}(i)-P_{PUSCH,c1}(i)$, where $0\leq w_{c2,7}(i)<1$.

If at least one second subframe of the N second subframes transmits a PUSCH that carries uplink control information UCI, and a PUSCH transmitted by the first subframe does not carry UCI, the determining transmit powers on the first subframe and the N second subframes includes:

when $P_{req\_c1}(i)+P_{req\_c2}(i)>P_{MAX}(i)$, using $P_{PUCCH,c1}(i)$ as a PUCCH transmit power on the first subframe i, using $P_{PUCCH,c2}(ij)$ as a PUCCH transmit power on a second subframe ij, using $w_{c1,5}(i)\times P_{PUSCH,c1}(i)$ as a PUSCH transmit power on the first subframe i, and using $\min\{P_{PUSCH,c2}(ir),P'_{PUSCH,c2}(iy)+w_{c2,8}(i)\times P_{PUSCH,c2}(i)-P_{PUCCH,c2}(ir)\}$ as a PUSCH transmit power on a second subframe ir, so that $w_{c1,5}(i) \times P_{PUSCH,c1}(i) + w_{c2,8}(i) \times P_{PUSCH,c2}(i) \leq P_{MAX}(i) - P_{PUCCH,c1}(i) - P'_{PUSCH,c2}(iy)$.

$P'_{PUSCH,c2}(iy) = \max\{P_{PUSCH,c2}(iy) + P_{PUCCH,c2}(iy)\}$, $0 \leq w_{c1,5}(i) < 1$, $0 \leq w_{c2,8}(i) < 1$, iy represents a sequence number of a second subframe that is of the N second subframes and that transmits a PUSCH that carries UCI, and ir represents a sequence number of a second subframe that is of the N second subframes and that does not transmit a PUSCH that carries UCI.

If the first subframe transmits a PUSCH that carries uplink control information UCI, and at least one second subframe of the N second subframes transmits a PUSCH that carries UCI, the determining transmit powers on the first subframe and the N second subframes includes:

when $P'_{PUSCH,c2}(iy) + P_{PUSCH,c1}(i) + P_{PUCCH,c1}(i) > P_{MAX}(i)$, using $w_{c1,6}(i) \times P_{PUSCH,c1}(i)$ as a PUSCH transmit power on the first subframe i, using $w_{c1,6}(i) \times P_{PUCCH,c1}(i)$ as a PUCCH transmit power on the first subframe i, and using $w_{c2,9}(iy) \times P'_{PUSCH,c2}(iy)$ as a PUSCH transmit power on a second subframe iy, so that $w_{c1,6}(i) \times P_{PUSCH,c1}(i) + w_{c1,6}(i) \times P_{PUCCH,c1}(i) + w_{c2,9}(iy) \times P'_{PUSCH,c2}(iy) \leq P_{MAX}(i)$.

$P'_{PUSCH,c2}(iy) = \max\{P_{PUSCH,c2}(iy) + P_{PUCCH,c2}(iy)\}$, $0 \leq w_{c1,6}(i) < 1$, $0 \leq w_{c2,9}(iy) < 1$, and iy represents a sequence number of a second subframe that is of the N second subframes and that transmits a PUSCH that carries UCI.

The determining transmit powers on the first subframe and the N second subframes includes:

if $P_{req\_c1}(i) + P_{req\_c2}(i) \leq P_{MAX}(i)$, determining that a transmit power on the first subframe is $P_{req\_c1}(i)$, and determining that transmit powers on the N second subframes are $P_{req\_c2}(i)$;

if $P_{req\_c1}(i) + P_{req\_c2}(i) > P_{MAX}(i)$ and $P_{req\_c1}(i) \leq P_{c1}(i)$, determining that a transmit power on the first subframe is $P_{req\_c1}(i)$, and determining that transmit powers on the N second subframes are $P_{MAX}(i) - P_{req\_c1}(i)$;

if $P_{req\_c1}(i) + P_{req\_c2}(i) > P_{MAX}(i)$ and $P_{req\_c2}(i) \leq \max\{P_{c2}(i1), \ldots, P_{c2}(iN)\}$, determining that a transmit power on the first subframe is $P_{MAX}(i) - P_{req\_c2}(i)$, and determining that transmit powers on the N second subframes are $P_{req\_c2}(i)$; or if $P_{req\_c1}(i) + P_{req\_c2}(i) > P_{MAX}(i)$, $P_{req\_c1}(i) > P_{c1}(i)$, and $P_{req\_c2}(i) > \max\{P_{c2}(i1), \ldots, P_{c2}(iN)\}$, determining that a transmit power on the first subframe is $P_{c1}(i) + P_{alloc\_c1}(i)$, and determining that transmit powers on the N second subframes are $P_{MAX}(i) - P_{c1}(i) - P_{alloc\_c1}(i)$, where if a priority of the first cell is higher than a priority of the second cell, $P_{alloc\_c1}(i)$ meets that $P_{alloc\_c1}(i) = \min\{P_{MAX}(i) - \max\{P_{c2}(i1), \ldots, P_{c2}(iN)\} - P_{c1}(i), P_{req\_c1}(i) - P_{c1}(i)\}$;

if a priority of the second cell is higher than a priority of the first cell, $P_{alloc\_c1}$ meets that $P_{alloc\_c1}(i) = \min\{P_{MAX}(i) - P_{c1}(i) - \min\{P_{MAX}(i) - P_{c1}(i), P_{req\_c2}(i)\}, P_{req\_c1}(i) - P_{c1}(i)\}$; or if a priority of the first cell is the same as a priority of the second cell, $P_{alloc\_c1}(i)$ meets that $P_{alloc\_c1}(i) = \beta \times (P_{MAX}(i) - P_{c1}(i) - \max\{P_{c2}(i1), \ldots, P_{c2}(iN)\})$; or $P_{alloc\_c1}(i)$ meets that $$\frac{P_{alloc\_c1}(i)}{P_{MAX}(i) - P_{c1}(i) - \max\{P_{c2}(i1), \ldots, P_{c2}(iN)\} - P_{alloc\_c1}(i)} = \frac{P_{req\_c1}(i) - P_{c1}(i)}{P_{req\_c2}(i) - \max\{P_{c2}(i1), \ldots, P_{c2}(iN)\}}; \text{ or}$$

$P_{alloc\_c1}$ meets that $$\frac{P_{alloc\_c1}(i)}{P_{MAX}(i) - P_{c1}(i) - \max\{P_{c2}(i1), \ldots, P_{c2}(iN)\} - P_{alloc\_c1}(i)} =$$

$$\frac{(P_{req\_c1}(i) - P_{c1}(i))/P_{c1}(i)}{(P_{req\_c2}(i) - \max\{P_{c2}(i1), \ldots, P_{c2}(iN)\})/\max\{P_{c2}(i1), \ldots, P_{c2}(iN)\}}; \text{ or}$$

$P_{alloc\_c1}(i)$ $$\frac{P_{alloc\_c1}(i)}{P_{MAX}(i) - P_{c1}(i) - \max\{P_{c2}(i1), \ldots, P_{c2}(iN)\} - P_{alloc\_c1}(i)} = \frac{P_{c1}(i)}{\max\{P_{c2}(i), \ldots, P_{c2}(iN)\}}, \text{ where}$$

$P_{c1}(i)$ and $P_{c2}(ij)$ are respectively a minimum guaranteed power on the first subframe i of the first cell and a minimum guaranteed power on the second subframe ij of the second cell, $\beta$ is a remaining power allocation parameter, and the remaining power allocation parameter is preconfigured or the remaining power allocation parameter is pre-obtained by the UE from the base station.

In this way, if a subframe of the second cell transmits a PUSCH and/or a PUCCH, a PUSCH and/or PUCCH power indicator may be determined, and therefore transmit powers on the first cell and the second cell are determined, so that transmission efficiency can be ensured.

Optionally, in the foregoing embodiments of this disclosure, $w_{c1,1}(i)$, $w_{c1,2}(i)$, $w_{c1,3}(i)$, $w_{c1,4}(i)$, $w_{c1,5}(i)$, and $w_{c1,6}(i)$, and $w_{c2,1}(ik)$, $w_{c2,2}(ik)$, $w_{c2,3}(ix)$, $w_{c2,4}(ij)$, $w_{c2,5}(i)$, $w_{c2,6}(i)$, $w_{c2,7}(i)$, $w_{c2,8}(i)$, and $w_{c2,9}(iy)$ may be predefined, or may be obtained by means of calculation by the UE, or may be configured by a base station.

Optionally, a scaling factor on the first subframe i of the first cell and a scaling factor on a corresponding second subframe of the second cell may be different. That is, different carriers may be configured with different scaling factors.

According to a second aspect, a power determining method is provided, where UE is configured with multiple cells, a first subframe of a first cell corresponds to N second subframes of a second cell, and the method includes:

calculating, by the UE, a first power requirement on the first subframe of the first cell, and calculating N second power requirements on the N second subframes of the second cell; and determining a transmit power on the first subframe and transmit powers on the N second subframes according to a magnitude relationship between the first power requirement, the N second power requirements, and a maximum transmit power of the UE and with reference to priority information of the first cell and the second cell, where N is a positive integer greater than 1.

Optionally, the first subframe is denoted as a subframe i, the N second subframes are denoted as subframes i1, i2, . . . , and iN, the first power requirement is denoted as $P_{req\_c1}(i)$, the second power requirement is denoted as $P_{req\_c2}(ij)$, the maximum transmit power corresponding to the first subframe i is denoted as $P_{MAX}(i)$, and a value range of j is 1 to N.

In the embodiments of this disclosure, transmit powers on the first cell and the second cell may be determined according to different cell priorities. In this way, data transmission of a high-priority cell can be ensured; in addition, resource utilization can be improved, and transmission efficiency can be ensured.

With reference to the second aspect, in a first possible implementation of the second aspect, if sending of the first cell and sending of the second cell are not aligned, the determining a transmit power on the first subframe and transmit powers on the second subframes includes:

if a priority of the first cell is higher than a priority of the second cell, determining that a transmit power on a second subframe i1 sent before the first subframe i is $\min\{P_{req\_c2}(i1), P_{c2}(i1)\}$, determining that the transmit power on the first subframe i is $\min\{P_{MAX}(i)-\min\{P_{req\_c2}(i1), P_{c2}(i1)\}, P_{req\_c1}(i)\}$, and determining that a transmit power on a second subframe ik is $\min\{P_{MAX}(i)-\min\{P_{req\_c2}(i1), P_{c2}(i1)\}, P_{req\_c1}(i)\}, P_{req\_c2}(ik)\}$; or if a priority of the second cell is higher than a priority of the first cell, determining that the transmit power on the first subframe i is $\min\{P_{req\_c1}(i), P_{c1}(i)\}$, determining that a transmit power on a second subframe ik is $\min\{P_{MAX}(i)-\min\{P_{req\_c1}(i), P_{c1}(i)\}, P_{req\_c2}(ik)\}$, and determining that a transmit power on a second subframe (i+1) 1 is $\min\{P_{MAX}(i+1)-P_{c1}(i+1), \min\{P_{MAX}(i)-\min\{P_{req\_c1}(i), P_{c1}(i)\}\}, P_{req\_c2}((i+1) 1)\}$, where $P_{c1}(i)$ and $P_{c2}(ij)$ are respectively a minimum guaranteed power on the first subframe i of the first cell and a minimum guaranteed power on the second subframe ij of the second cell, and a value range of k is 2 to N.

That is, all remaining powers are allocated to a high-priority cell, or the remaining powers are allocated to different cells according to a proportion. In this way, resource utilization can be improved.

With reference to the second aspect, in a second possible implementation of the second aspect, the determining a transmit power on the first subframe and transmit powers on the second subframes includes:

determining that the transmit powers on the second subframes are the second power requirements, and determining a transmit power on each symbol of the first subframe, so that an overall transmit power is less than or equal to the maximum transmit power.

Specifically, it is determined that a transmit power on a second subframe ij is $P'_{c2}(ij)$, and it is determined that a transmit power on a symbol that is on the first subframe i and that corresponds to the second subframe ij is $\min\{P_{c1}(i), P_{MAX}(i)-P'_{c2}(ij)\}$, where $P_{c1}(i)$ is a minimum guaranteed power on the first subframe i of the first cell.

In this way, symbol-level power control of the first cell can be implemented, and symbol-level resource utilization can be improved.

According to a third aspect, user equipment is provided, where the user equipment is configured with multiple cells, a first subframe of a first cell corresponds to N second subframes of a second cell, and the user equipment includes: a first calculation unit, configured to calculate a first power requirement on the first subframe, and calculate N second power requirements on the N second subframes; a second calculation unit, configured to calculate a power indicator on the N second subframes according to the N second power requirements; and a determining unit, configured to determine transmit powers on the first subframe and the N second subframes according to a magnitude relationship between a maximum transmit power and a sum of the first power requirement and the power indicator. The user equipment may be configured to perform processes performed by the user equipment in the method according to the first aspect and the implementations of the first aspect.

According to a fourth aspect, user equipment is provided, where the user equipment is configured with multiple cells, a first subframe of a first cell corresponds to N second subframes of a second cell, and the user equipment includes: a first calculation unit, configured to calculate a first power requirement on the first subframe of the first cell, and calculate N second power requirements on the N second subframes of the second cell; and a determining unit, configured to determine a transmit power on the first subframe and transmit powers on the N second subframes according to a magnitude relationship between the first power requirement, the N second power requirements, and a maximum transmit power of the UE and with reference to priority information of the first cell and the second cell. The user equipment may be configured to perform processes performed by the user equipment in the method according to the second aspect and the implementations of the second aspect.

According to a fifth aspect, user equipment is provided, including a processor, a transceiver, and a memory. The user equipment may be configured to perform processes performed by the user equipment in the method according to the first aspect and the implementations of the first aspect.

According to a sixth aspect, user equipment is provided, including a processor, a transceiver, and a memory. The user equipment may be configured to perform processes performed by the user equipment in the method according to the second aspect and the implementations of the second aspect.

According to a seventh aspect, a computer readable storage medium is provided, where the computer readable storage medium stores a program, and the program enables user equipment to execute any power determining method according to the first aspect and the implementations of the first aspect.

According to an eighth aspect, a computer readable storage medium is provided, where the computer readable storage medium stores a program, and the program enables user equipment to execute any power determining method according to the second aspect and the implementations of the second aspect.

DESCRIPTION OF EMBODIMENTS

The following describes embodiments of this disclosure with reference to accompanying drawings.

In the embodiments of this disclosure, a base station may be a base transceiver station (Base Transceiver Station, BTS) in a Global System for Mobile communications (Global System for Mobile communication, GSM) system or a Code Division Multiple Access (Code Division Multiple Access, CDMA) system, or may be a NodeB (NodeB) in a Wideband Code Division Multiple Access (Wideband Code Division Multiple Access, WCDMA) system, or may be an evolved NodeB (Evolutional Node B, eNB or eNodeB) in an LTE system, or may be a base station device or a small-cell base station device in a future 5G network. This is not limited in this disclosure.

User equipment (User Equipment, UE) in the embodiments of this disclosure may communicate with one or more core networks (Core Network) by using a radio access network (Radio Access Network, RAN), and the UE may be referred to as an access terminal, terminal equipment, a subscriber unit, a subscriber station, a mobile station, a mobile console, a remote station, a remote terminal, a mobile device, a user terminal, a terminal, a wireless communications device, a user agent, or a user apparatus. The UE may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, or a terminal device in a future 5G network.

Figure 1:
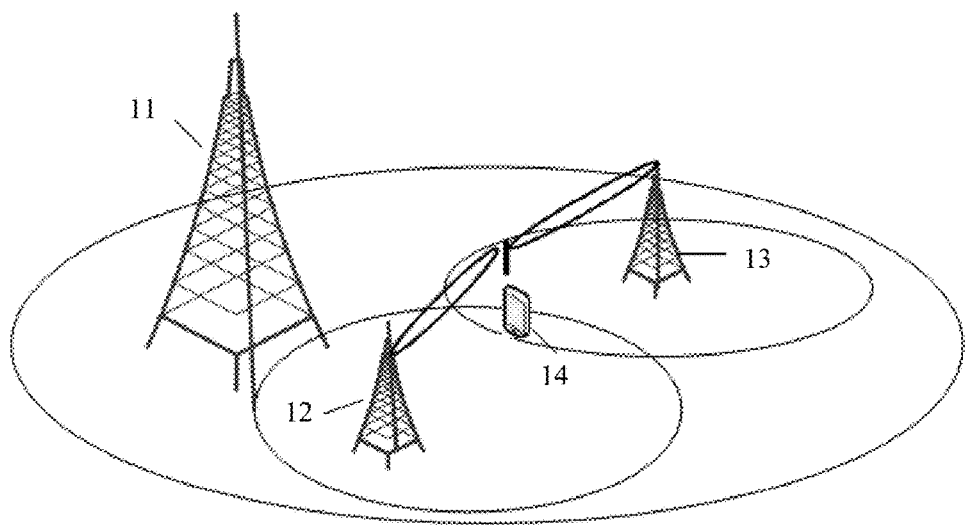
FIG. 1 is a schematic diagram of an application scenario according to an embodiment of this disclosure.

FIG. 1 is a schematic diagram of an application scenario according to an embodiment of this disclosure. FIG. 1 shows a high and low frequency hybrid networking system, including a base station 11, a base station 12, a base station 13, and UE 14.

In this embodiment of this disclosure, a frequency used by the base station 11 may be lower than frequencies used by the base station 12 and the base station 13. The base station 11 covers a relatively large area, and the base station 12 and the base station 13 provide hotspot coverage in the coverage area of the base station 11, to improve capacity of a hotspot region. The UE 14 is usually equipped with both a low-frequency transceiver and a high-frequency transceiver. For example, the base station 11 may be an LTE eNB, and the base station 12 and the base station 13 may be millimeter wave (mmWave) eNBs.

A relatively low frequency band carrier and a millimeter wave carrier may be aggregated to provide higher bandwidth and a higher capacity for a user. The relatively low frequency band carrier is used as a primary carrier (PCell), and the millimeter wave frequency band carrier is used as a secondary carrier (SCell). The PCell and the SCell may be co-located (co-located) or non co-located (non co-located). The SCell is located in a coverage area of the PCell, or coverage areas of the SCell and the PCell overlap. When the PCell and the SCell are non co-located, an LTE-A base station that provides a PCell and one or more millimeter wave small-cell base stations or remote radio heads (remote radio head, RRH) that provide one or more SCells perform backhaul (backhaul) communication by using an optical fiber or by using a wireless connection. A microwave or millimeter wave band may be used for wireless backhaul, and the band for wireless backhaul may be the same as or different from a band in which an SCell is located.

It may be learned that the UE 14 is located in both the coverage area of the base station 11 and a coverage area of the base station 12. That is, the UE 14 is configured with multiple serving cells. One serving cell corresponds to one carrier. Therefore, that the UE 14 is configured with multiple serving cells may mean that the UE 14 is configured with multiple carriers, that is, carrier aggregation is implemented.

If the UE 14 is configured with multiple cell groups, the multiple cell groups may include a primary cell group and a secondary cell group. In this case, it may mean that the UE 14 is in a dual connectivity mode.

Figure 2:
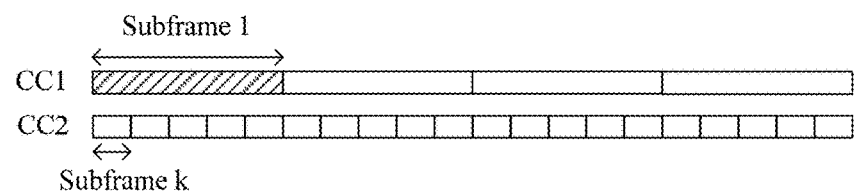
FIG. 2 is a schematic diagram of a correspondence between a first subframe and a second subframe according to an embodiment of this disclosure.

In a scenario of carrier aggregation (Carrier Aggregation, CA) and dual connectivity (Dual-Connectivity, DC), a first subframe of a cell corresponds to multiple second subframes of another cell, or it may also be denoted that a subframe of a carrier corresponds to multiple subframes of another carrier, as shown in FIG. 2. A length of one subframe of a first carrier CC1 is equal to a length of five subframes of a second carrier CC2.

It should be noted that a correspondence between subframes described herein is a correspondence between time domain lengths. For example, in FIG. 2, a time domain length of the first subframe is equal to a sum of time domain lengths of five second subframes; therefore, the first subframe corresponds to five second subframes.

It should be understood that the first carrier and the second carrier in this embodiment of this disclosure may be different frequency bands of a same carrier. For example, bandwidth of a carrier is 20 MHz, the first carrier is 5 MHz of 20 MHz, and the second carrier is another 5 MHz of 20 MHz. That is, the first carrier and the second carrier in this embodiment of this disclosure may be different subcarriers or different frequency domain parts of a same carrier. The different subcarriers or frequency domain parts of the same carrier may be corresponding to different frame structures. For example, the different subcarriers or frequency domain parts of the same carrier may have different subcarrier spacings and/or different cyclic prefixes (CP, Cyclic Prefix) and/or use different time granularities. For example, a first subframe of the first carrier may be corresponding to multiple second subframes of the second carrier.

For example, a subcarrier spacing may be 15 kHz, 30 kHz, or 60 kHz.

For example, a CP may be a normal CP or an extended CP.

There may be multiple definitions of a time granularity, such as a subframe, a timeslot, and a mini-slot.

For example, that the different subcarriers or frequency domain parts of the same carrier use different time granularities may be that the first carrier uses a subframe as a time granularity, for example, a subframe length is 1 ms, and the second carrier uses a timeslot as a time granularity, for example, a timeslot length is 0.5 ms. Alternatively, for example, time granularities used by the first carrier and the second carrier are both subframes; however, a subframe length of the first carrier is 1 ms, and a subframe length of the second carrier is 0.5 ms.

It should be further understood that in this embodiment of this disclosure, the first carrier may be a low-frequency carrier, and the second carrier may be a high-frequency carrier. For example, a first cell may be a cell in which the base station 11 is located, and a second cell may be a cell in which the base station 12 or the base station 13 is located.

For example, in FIG. 1, the UE 14 is configured with three cells. Because different carriers may be configured with different power parameters, power values that are obtained, by means of calculation, for the different carriers are different. In this embodiment of this disclosure, two cells are used as an example for analysis, so as to determine a transmit power on a first subframe of the first cell, and determine a transmit power on a second subframe of the second cell.

For the foregoing scenario, UE may separately determine a transmit power on a subframe of the first cell and a transmit power on each subframe of the second cell. For different transmissions, determined transmit powers are different, which are described in detail in the following embodiment.

It is assumed that a serving cell in which the UE is located is c. A transmit power calculated below is a transmission power of the UE on the serving cell c.

I. Calculation of a Physical Uplink Shared Channel (Physical Uplink Shared Channel, PUSCH) Transmission Power in a Carrier Aggregation Scenario:

1. If a subframe transmits a PUSCH but does not transmit a physical uplink control channel (Physical Uplink Control Channel, PUCCH), the PUSCH transmission power is as follows:

$$P_{PUSCH}(i) = \min\begin{Bmatrix} P_{CMAX}(i), \\ 10\log_{10}(M_{PUSCH}(i)) + P_{O\_PUSCH}(j) + \\ \alpha(j) \cdot PL + \Delta_{TF}(i) + f(i) \end{Bmatrix} \text{[dBm]}$$

2. If a subframe transmits both a PUSCH and a PUCCH, the PUSCH transmission power is as follows:

$$P_{PUSCH}(i) = \min\begin{Bmatrix} 10\log_{10}(\hat{P}_{CMAX}(i) - \hat{P}_{PUCCH}(i)), \\ 10\log_{10}(M_{PUSCH}(i)) + P_{O\_PUSCH}(j) + \\ \varepsilon(j) \cdot PL + \Delta_{TF}(i) + f(i) \end{Bmatrix} \text{[dBm]}$$

3. If a subframe does not transmit a PUSCH, and a power value indicated by a received PUCCH-related transmitter power control (Transmitter Power Control, TPC) command (command) in a downlink control information (Downlink Control Information, DCI) format 3/3A is accumulated, the PUSCH transmission power is calculated as follows:

$$P_{PUSCH}(i) = \min\{P_{CMAX}(i), P_{O\_PUSCH}(1) + \alpha(1) \cdot PL + f(i)\} \text{ [dBm]}$$

Meanings of symbols and parameters are as follows:

(1). min represents using a minimum value, and log represents using a logarithm.

(2). $P_{CMAX}(i)$ is a configured maximum transmission power of the UE on a subframe i of the serving cell c, and $\hat{P}_{CMAX}(i)$ is a linear value of $P_{CMAX}(i)$. If the UE transmits PUCCH without PUSCH on the subframe i of the serving cell c, a power value indicated by a received PUCCH-related TPC command in a DCI format 3/3A is accumulated. If the UE transmits neither the PUCCH nor the PUSCH on the subframe i of the serving cell c, the power value indicated by the received PUCCH-related TPC command in the DCI format 3/3A is accumulated, and $P_{CMAX}(i)$ is calculated on the assumption that MPR=0 dB, A–MPR=0 dB, P–MPR=0 dB, and TC=0 dB. For a specific definition, refer to an existing standard, such as 3GPP Technical Specification Group Radio Access Network (Technical Specification Group Radio Access Network, TS-GRAN) 36.101.

(3). $\hat{P}_{PUCCH}(i)$ is a linear value of $P_{PUCCH}(i)$, and a definition of $P_{PUCCH}(i)$ is described subsequently.

(4). $M_{PUSCH}(i)$ is bandwidth of a PUSCH resource allocated to the subframe i of the serving cell c, and is denoted by using a quantity of valid resource blocks (Resource Block, RB).

(5). If the UE is configured with a high-layer parameter UplinkPowerControlDedicated-v12x0 for the serving cell c, and if the subframe i belongs to an uplink power control subframe set 2 indicated by a high-layer parameter tpc-SubframeSet-r12:

(5.1). When j=0, $P_{O\_PUSCH}(0) = P_{O\_UE\_PUSCH,2}(0) + P_{O\_NOMINAL\_PUSCH,2}(0)$, where j=0 is used to be corresponding to PUSCH transmission/retransmission of semi-persistent grant. $P_{O\_UE\_PUSCH,2}(0)$ and $P_{O\_NOMINAL\_PUSCH,2}(0)$ are provided by using high-layer parameters p0-UE-PUSCH-Persistent-SubframeSet2-r12 and p0-Nominal-PUSCH-Persistent-SubframeSet2-r12.

(5.2). When j=1, $P_{O\_PUSCH}(1)$ $P_{O\_UE\_PUSCH,2}(1) + P_{O\_NOMINAL\_PUSCH,2}(1)$ where j=1 is used to be corresponding to PUSCH transmission/retransmission of dynamic scheduled grant. $P_{O\_UE\_PUSCH,2}(1)$ and $P_{O\_NOMINAL\_PUSCH,2}(1)$ are provided by using high-layer parameters p0-UE-PUSCH-SubframeSet2-r12 and p0-NominalPUSCH-SubframeSet2-r12.

(5.3). When j=2, $P_{O\_PUSCH}(2) = P_{O\_UE\_PUSCH}(2) + P_{O\_NOMINAL\_PUSCH}(2)$, where j=2 is used to be corresponding to PUSCH transmission/retransmission of random access response grant. $P_{O\_UE\_PUSCH}(2) = 0$, and $P_{O\_NOMINAL\_PUSCH}(2) = P_{O\_PRE} + \Delta_{PREAMBLE\_Msg3}$, where parameters preambleInitialReceivedTargetPower ($P_{O\_PRE}$) and $\Delta_{PREAMBLE\_Msg3}$ are defined at a high layer.

Otherwise, (5.4) $P_{O\_PUSCH}(j)$ includes a sum of a parameter part $P_{O\_NOMINAL\_PUSCH}(j)$, where j=0, and j=1, and a parameter part $P_{O\_UE\_PUSCH}(j)$, where j=0, and j=1, that are provided at a high layer. For PUSCH transmission (retransmission) of semi-persistent grant, j=0; for PUSCH transmission (retransmission) of dynamic scheduled grant, j=1; and for PUSCH transmission (retransmission) of random access response grant, j=2. $P_{O\_UE\_PUSCH}(2) = 0$, and $P_{O\_NOMINAL\_PUSCH}(2) = P_{O\_PRE} + \Delta_{PREAMBLE\_Msg3}$, where parameters preambleInitialReceivedTargetPower ($P_{O\_PRE}$) and $\Delta_{PREAMBLE\_Msg3}$ are defined at a high layer.

(6). If the UE is configured with a high-layer parameter UplinkPowerControlDedicated-v12x0 for the serving cell c, and if the subframe i belongs to an uplink power control subframe set 2 indicated by a high-layer parameter tpc-SubframeSet-r12:

(6.1). For j=0 or j=1, $\alpha(j) = \alpha_2 \in \{0, 0.4, 0.5, 0.6, 0.7, 0.8, 0.9, 1\} \cdot \alpha_2$ is a parameter alpha-SubframeSet2-r12 provided at a high layer. For j=2, $\alpha(j)=1$.

Otherwise, (6.2). For j=0 or j=1, $\alpha_c \in \{0, 0.4, 0.5, 0.6, 0.7, 0.8, 0.9, 1\}$ is a 3-bit parameter provided at a high layer. For j=2, $\alpha(j)=1$.

(7). PL is a downlink loss obtained by means of estimated calculation for the UE of the serving cell c. PL=referenceSignalPower high-layer reference signal received power (Reference Signal Received Power, RSRP), where referenceSignalPower is provided at a high layer. For a definition of the RSRP, refer to a definition of the serving cell.

(8). $\Delta_{TF}(i) = 10\log_{10}((2^{BPRE \cdot K_s} - 1) \cdot \beta_{offset}^{PUSCH})$.

(9). $\delta_{PUSCH}$ is a correlation value and is based on a TPC command.

Mapping of the foregoing TPC command domain may be shown in Table 1 and Table 2 below.

TABLE 1

| TPC command domain in a DCI format 0/3/4 | Accumulated $\delta_{PUSCH}$ [dB] | Accumulated $\delta_{PUSCH}$ [dB] in a DCI format 0/4 |
| --- | --- | --- |
| 0 | −1 | −4 |
| 1 | 0 | −1 |
| 2 | 1 | 1 |
| 3 | 3 | 4 |

TABLE 2

| TPC command domain in a DCI format 3A | Accumulated $\delta_{PUSCH}$ [dB] |
| --- | --- |
| 0 | −1 |
| 1 | 1 |

II. Calculation of a PUCCH Transmission Power in a Carrier Aggregation Scenario:

1. A PUCCH transmission power on a subframe i is as follows:

$$P_{PUCCH}(i)=\min\{P_{CMAX}(i),P_{O\_PUCCH}+PL+h(n_{CQI},n_{HARQ},n_{SR})+\Delta_{F\_PUCCH}(F)+\Delta_{TxD}(F')+g(i)\} \text{ [dBm]}$$

2. If the UE in the primary cell does not transmit a PUCCH, a power value indicated by a TPC command of the PUCCH is accumulated, and the PUCCH transmission power is as follows:

$$P_{PUCCH}(i)C=\min\{P_{CMAX}(i),P_{O\_PUCCH}+PL+g(i)\} \text{ [dBm]}$$

Meanings of symbols and parameters are as follows:

(1). min represents using a minimum value, and log represents using a logarithm.

(2). $P_{CMAX}(i)$ is a configured maximum transmission power of the UE on the subframe i of the serving cell c. If the UE transmits PUCCH without PUSCH on the subframe i of the serving cell c, a power value indicated by a received PUCCH-related TPC command in a DCI format 3/3A is accumulated. If the UE transmits neither the PUCCH nor the PUSCH on the subframe i of the serving cell c, the power value indicated by the received PUCCH-related TPC command in the DCI format 3/3A is accumulated, and $P_{CMAX}(i)$ is calculated on the assumption that MPR=0 dB, A−MPR=0 dB, P−MPR=0 dB, and TC=0 dB. For a specific definition, refer to an existing standard, such as 3GPP TS-GRAN 36.101.

(3). $\Delta_{F\_PUCCH}(F)$ is provided at a high layer. Each $\Delta_{F\_PUCCH}(F)$ value corresponds to a PUCCH format (F) related to a PUCCH format 1A. The PUCCH format (F) is defined in Table 5.4-1 in 3GPP TS-GRAN 36.211. Table 3 shows a supported PUCCH format.

TABLE 3

| PUCCH format | Modulation scheme | A quantity $M_{bit}$ of bits of each subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

(4). If the UE is configured at a high layer to transmit a PUCCH on two antenna ports, $\Delta_{TxD}(F')$ is provided at a high layer, and a PUCCH format F' is defined in Table 5.4-1 (as shown in Table 3 above) in 3GPP TS-GRAN 36.211; otherwise, $\Delta_{TxD}(F')=0$.

(5). $h(n_{CQI}, n_{HARQ}, n_{SR})$ is a value related to a PUCCH format, where $n_{CQI}$ represents a quantity of information bits of channel quality information. If the subframe i is a subframe configured for a scheduling request (Scheduling Request, SR) of UE without any transmission block related to UL-SCH, $n_{SR}=1$, otherwise, $n_{SR}=0$. $n_{HARQ}$ is a quantity of HARQ-ACK bits sent by the UE.

(6). $P_{O\_PUCCH}$ is a parameter formed by a sum of a parameter $P_{O\_NOMINAL\_PUCCH}$ provided at a high layer and a parameter $P_{O\_UE\_PUCCH}$ provided at a high layer.

(7). $\delta_{PUCCH}$ is a correlation value and is based on a TPC command. Mapping of the foregoing TPC command domain may be shown in Table 4 and Table 5 below.

TABLE 4

| TPC command domain in a DCI format 1A/1B/1D/1/2A/2B/2C/2D/2/3 | $\delta_{PUCCH}$ [dB] |
| --- | --- |
| 0 | −1 |
| 1 | 0 |
| 2 | 1 |
| 3 | 3 |

TABLE 5

| TPC command domain in a DCI format 3A | $\delta_{PUCCH}$ [dB] |
| --- | --- |
| 0 | −1 |
| 1 | 1 |

III. Calculation of a physical random access channel (Physical Random Access Channel, PRACH) transmission power in a carrier aggregation scenario:

A preamble (preamble) target receive power is indicated by using a high layer, where the preamble target receive power is denoted as PREAMBLE_RECEIVED_TARGET_POWER.

A definition of a PRACH preamble transmission power (preamble transmission power) is as follows:

$$P_{PRACH}=\min\{PC_{M}MA(i),\text{PREAMBLE\_RECEIVED\_TARGET\_POWER}+PL)\} \text{ [dBm]}$$

Meanings of symbols and parameters are as follows:

(1). $P_{CMAX,c}(i)$ is a configured maximum transmission power of the UE on the subframe i of the serving cell c.

(2). PL is a downlink loss obtained by means of estimated calculation for the UE of the serving cell c.

In a carrier aggregation scenario, when a first subframe of a first cell corresponds to multiple second subframes of a second cell, this embodiment of this disclosure provides a power determining method, to determine transmit powers on the first subframe and the multiple second subframes.

First, UE may calculate a first power requirement on the first subframe and calculate multiple second power requirements on the multiple second subframes by using the foregoing method in the prior art. It is assumed that the first subframe corresponds to N second subframes, the first subframe is denoted as a subframe i, and the N second subframes are sequentially denoted as subframes i1, i2, . . . , and iN. Herein, N is a positive integer greater than 1. Correspondingly, the first power requirement on the first subframe i is denoted as $P_{req\_c1}(i)$, and a second power requirement on a second subframe ij is denoted as $P_{req\_c2}(ij)$, where a value range of j is 1 to N. N is a positive integer greater than 1. It is assumed that a maximum transmit power of the UE is $P_{MAX}(i)$.

It may be understood that not every second subframe transmits information. If a second subframe does not transmit information, a second power requirement corresponding to the second subframe is 0. That is, one or more of the foregoing N second power requirements are 0.

Figure 3:
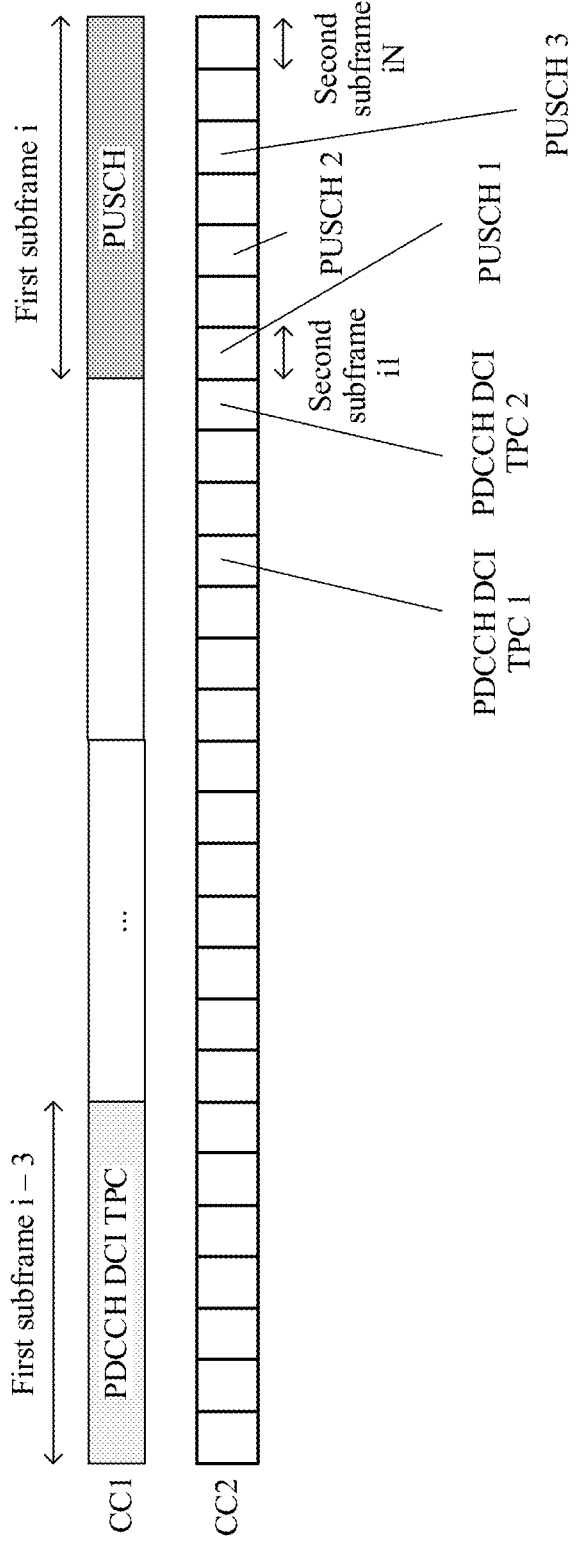
FIG. 3 a schematic diagram of transmitting information between a first subframe and a second subframe according to an embodiment of this disclosure.

For example, as shown in FIG. 3, the first subframe i corresponds to seven second subframes, second subframes i1, i3, and i5 respectively transmit a PUSCH 1, a PUSCH 2, and a PUSCH 3, and $P_{req\_c2}(i2)=P_{req\_c2}(i4)=P_{req\_c2}(i6)=P_{req\_c2}(i7)=0$.

Optionally, in this embodiment of this disclosure, the foregoing calculated first power requirement (that is, $P_{req\_c1}(i)$) is used as a transmit power on the first subframe. For any j, if $P_{req\_c1}(i)+P_{req\_c2}(ij)>P_{MAX}(i)$, $w(ij)\times P_{req\_c2}(ij)$ is used as a transmit power on the second subframe ij, so that $P_{req\_c1}(i)+w(ij)\times P_{req\_c2}(ij)\leq P_{MAX}(i)$. w(ij) is a scaling factor of a power of the second subframe ij of the second cell (that is, a second carrier or a high-frequency cell). w(ij) may be predefined, or may be obtained by means of calculation by the UE, or may be configured by a base station, and $0\leq w(ij)<1$. That is, in this case, only a transmit power on the second subframe is adjusted.

It may be learned that in this embodiment, if a sum of the first power requirement and the second power requirement is greater than the maximum transmit power, the second power requirement is scaled for use as the transmit power on the second subframe, so that an overall transmission power (that is, $P_{req\_c1}(i)+w(ij)\times P_{req\_c2}(ij)$) is less than or equal to the maximum transmit power. It may be understood that in this embodiment, transmission in the first cell is preferentially ensured.

Herein, $P_{req\_c1}(i)+w(ij)\times P_{req\_c2}(ij)\leq P_{MAX}(i)$ is used as a condition for determining the scaling factor w(ij). An adjusted overall transmission power is $P_{req\_c1}(i)+w(ij)\times P_{req\_c2}(ij)$, and the overall transmission power is not greater than the maximum transmit power $P_{MAX}(i)$.

It may be understood that if $P_{req\_c1}(i)+P_{req\_c2}(ij)\leq P_{MAX}(i)$, $P_{req\_c1}(i)$ is used as the transmit power on the first subframe i, and $P_{req\_c2}(ij)$ is used as the transmit power on the second subframe ij. That is, in this case, transmit powers on the first subframe and the second subframe are not adjusted.

It may be learned that if the overall transmission power determined according to the first power requirement and the second power requirement is less than the maximum transmit power, the transmit powers on the first subframe and the second subframe do not need to be adjusted.

For example, in a scenario shown in FIG. 3, the first cell is denoted as c1, and the second cell is denoted as c2. A first subframe i–3 transmits a physical downlink control channel (Physical Downlink Control Channel, PDCCH) DCI TPC, and the first subframe i transmits a PUSCH. The multiple second subframes corresponding to the first subframe i are a second subframe i1, a second subframe i2, . . . , and a second subframe iN. FIG. 3 shows that a second subframe located before the second subframe i1 transmits a PDCCH DCI TPC 1, and another second subframe located before the second subframe i1 transmits a PDCCH DCI TPC 2.

It is assumed that three second subframes of the second subframe i1 to the second subframe iN respectively transmit a PUSCH 1, a PUSCH 2, and a PUSCH 3. If $P_{req\_c1}(i)+P_{req\_c2}(i1)>P_{MAX}$, any value of w(i1) between 0 and $(P_{MAX}(i)-P_{req\_c1}(i))\div P_{req\_c2}(i1)$ may be calculated, and $w(i1)\times P_{req\_c2}(i1)$ is used as the transmit power on the second subframe i1.

In this way, in this embodiment, the power on the second subframe is scaled, and the transmit power on the second subframe is determined, so that the overall transmission power of the UE is not greater than the maximum transmit power of the UE, and transmission efficiency is ensured.

Figure 4:
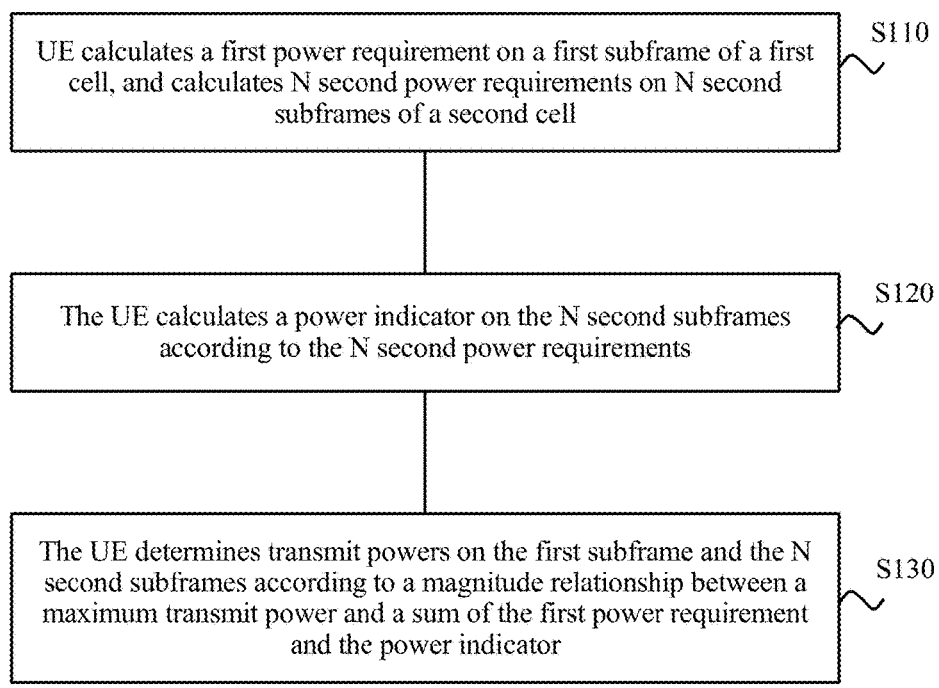
FIG. 4 is a flowchart of a power determining method according to an embodiment of this disclosure.

Optionally, in another embodiment, UE may adjust a transmit power on a first subframe and/or a second subframe according to to-be-transmitted content of the first subframe and the second subframe. FIG. 4 is a flowchart of a power determining method according to an embodiment of this disclosure. The method includes the following steps.

S110. UE calculates a first power requirement on a first subframe of the first cell, and calculates N second power requirements on N second subframes of the second cell.

S120. The UE calculates a power indicator on the N second subframes according to the N second power requirements.

S130. The UE determines transmit powers on the first subframe and the N second subframes according to a magnitude relationship between a maximum transmit power and a sum of the first power requirement and the power indicator.

It may be understood that a power requirement is an actually required power, a power allocated by a TPC command, or the like.

Specifically, in S110, the UE may calculate the first power requirement and the second power requirements by using the foregoing method in the prior art. It is assumed that the first subframe corresponds to the N second subframes, the first subframe is denoted as a first subframe i, and the corresponding multiple second subframes are sequentially denoted as second subframes i1, i2, . . . , and iN. The first power requirement is denoted as $P_{req\_c1}(i)$, and the second power requirement is denoted as $P_{req\_c2}(ij)$, where a value range of j is 1 to N. That is, $P_{req\_c1}(i)$ represents the first power requirement on the first subframe i, and $P_{req\_c2}(ij)$ represents a second power requirement on a second subframe ij corresponding to the first subframe i. It is assumed that a maximum transmit power of the UE is $P_{MAX}(i)$.

That the first subframe corresponds to the N second subframes may mean that a time domain length of the first subframe is greater than a time domain length of N−1 second subframes and less than a time domain length of N+1 second subframes.

The first subframe may transmit a PRACH, or a PUSCH, or a PUCCH, or a PUSCH and a PUCCH, and the PUSCH transmitted by the first subframe may carry or not carry uplink control information (Uplink Control Information, UCI). The multiple second subframes may transmit at least one of a PRACH, a PUSCH, or a PUCCH, and the PUSCH transmitted by the second subframes may carry or not carry UCI.

If the first subframe i transmits a PRACH, $P_{req\_c1}(i)=P_{PRACH,c1}(i)$.

If the first subframe i transmits a PUSCH and/or a PUCCH, $P_{req\_c1}(i)=P_{PUSCH,c1}(i)+P_{PUCCH,c1}(i)$. If the first subframe i transmits only a PUSCH and does not transmit a PUCCH, $P_{PUCCH,c1}(i)=0$; or if the first subframe i transmits only a PUCCH and does not transmit a PUSCH, $P_{PUSCH,c1}(i)=0$.

If the second subframe ij transmits a PRACH, $P_{req\_c2}(ij)=P_{PRACH,c2}(ij)$.

If the second subframe ij transmits a PUSCH and/or a PUCCH, $P_{req\_c2}(ij)=P_{PUSCH,c2}(ij)+P_{PUCCH,c2}(ij)$. If the second subframe ij transmits only a PUSCH and does not transmit a PUCCH, $P_{PUCCH,c2}(ij)=0$; or if the second subframe ij transmits only a PUCCH and does not transmit a PUSCH, $P_{PUSCH,c2}(ij)=0$.

In this embodiment of this disclosure, if a second subframe ix of the multiple second subframes (i1 to iN) transmits a PRACH, that is, if at least one second subframe of the multiple second subframes transmits a PRACH, in S120, the power indicator may be denoted as $P_{PRACH,c2}(i)$, and the power indicator $P_{PRACH,c2}(i)$ may be calculated in any one of the following manners:

$P_{PRACH,c2}(i)=\max\{P_{PUCCH,c2}(ik)+P_{PUSCH,c2}(ik), P_{PRACH,c2}(ix)\}$; or $P_{PRACH,c2}(i)=\min\{P_{PUCCH,c2}(ik)+P_{PUSCH,c2}(ik), P_{PRACH,c2}(ix)\}$; or $P_{PRACH,c2}(i)=\gamma_{c2}(ik)\times(P_{PUCCH,c2}(ik)+P_{PUSCH,c2}(ik))+\gamma_{c2}(ix)\times P_{PRACH,c2}(ix)$; or $P_{PRACH,c2}(i)=\max\{P_{PRACH,c2}(ix)\}$; or $P_{PRACH,c2}(i)=\min\{P_{PRACH,c2}(ix)\}$. $\gamma_{c2}(ik)$ represents a scaling factor of the second subframe ij, and $0\le\gamma_{c2}(ij)\le 1$.

ik represents a sequence number of a second subframe that is of ij and that does not transmit a PRACH, and ix represents a sequence number of a second subframe that is of ij and that transmits a PRACH.

It should be noted that the foregoing expression for calculating $P_{PRACH,c2}(i)$ is representation of a tensor. For example, it is assumed that in the N second subframes, a value of k is 1 to N−2, and a value of x is N−1 and N. That is, if the first N−2 second subframes do not transmit a PRACH, and the last two second subframes transmit a PRACH, $P_{PRACH,c2}(i)=\max\{P_{PUCCH,c2}(ik)+P_{PUSCH,c2}(ik),$ and $P_{PRACH,c2}(ix)\}=\max\{P_{PUCCH,c2}(i1)+P_{PUSCH,c2}(i1), P_{PUCCH,c2}(i2)+P_{PUSCH,c2}(i2), \ldots, P_{PUCCH,c2}(i(N-2))+P_{PUSCH,c2}(i(N-2)), P_{PRACH,c2}(i(N-1)), P_{PRACH,c2}(iN)\}$.

$P_{PRACH,c2}(ix)$ represents a second power requirement on the second subframe ix, and $P_{PUCCH,c2}(ik)+P_{PUSCH,c2}(ik)$ represents a second power requirement on a second subframe ik. $P_{PUCCH,c2}(ik)$ represents a PUCCH power requirement on the second subframe ik, and $P_{PUSCH,c2}(ik)$ represents a PUSCH power requirement on the second subframe ik. It may be understood that if the second subframe ik transmits only a PUCCH, $P_{PUSCH,c2}(ik)=0$; if the second subframe ik transmits only a PUSCH, $P_{PUCCH,c2}(ik)=0$; or if the second subframe ik transmits neither a PUSCH nor a PUCCH, $P_{PUSCH,c2}(ik)=P_{PUCCH,c2}(ik)=0$.

In this embodiment of this disclosure, if no second subframe of the N second subframes (i1 to iN) transmits a PRACH, in S120, the power indicator may be denoted as $P_{req\_c2}(i)$, and the power indicator $P_{req\_c2}(i)$ is calculated in Manner 1 or Manner 2 below.

Manner 1: $P_{req\_c2}(i)=P_{PUCCH,c2}(i)+P_{PUSCH,c2}(i)$. $P_{PUCCH,c2}(i)$ represents a PUCCH power indicator on the N second subframes i1 to iN.

$P_{PUCCH,c2}(i)=\max\{P_{PUCCH,c2}(i1),P_{PUCCH,c2}(i2),\ldots,P_{PUCCH,c2}(iN)\}$; or $P_{PUCCH,c2}(i)=\min\{P_{PUCCH,c2}(i1),P_{PUCCH,c2}(i2),\ldots,P_{PUCCH,c2}(iN)\}$; or $P_{PUCCH,c2}(i)=\alpha\times(P_{PUCCH,c2}(i1)+P_{PUCCH,c2}(i2)+\ldots+P_{PUCCH,c2}(iN))$.

$P_{PUSCH,c2}(i)$ represents a PUSCH power indicator on the N second subframes i1 to iN.

$P_{PUSCH,c2}(i)=\max\{P_{PUSCH,c2}(i1),P_{PUSCH,c2}(i2),\ldots,P_{PUSCH,c2}(iN)\}$; or $P_{PUSCH,c2}(i)=\min\{P_{PUSCH,c2}(i1),P_{PUSCH,c2}(i2),\ldots,P_{PUSCH,c2}(iN)\}$; or $P_{PUSCH,c2}(i)=\alpha\times(P_{PUSCH,c2}(i1)+P_{PUSCH,c2}(i2)+\ldots+P_{PUSCH,c2}(iN))$.

$P_{req\_c2}(i)=\max\{P_{req\_c2}(i1),P_{req\_c2}(i2),\ldots,P_{req\_c2}(iN)\}$; or $P_{req\_c2}(i)=\min\{P_{req\_c2}(i1),P_{req\_c2}(i2),\ldots,P_{req\_c2}(iN)\}$; or $P_{req\_c2}(i)=\alpha\times(P_{req\_c2}(i1)+P_{req\_c2}(i2)+\ldots+P_{req\_c2}(iN))$. Manner 2:

$\alpha$ is a power parameter, and the power parameter $\alpha$ is preconfigured or the power parameter $\alpha$ is pre-obtained by the UE from a base station. For example, before sending a first carrier, the UE receives control signaling sent by a base station of the first cell, and the control signaling includes a value of the power parameter a.

In addition, the method in this embodiment of this disclosure may be applied to different cases. Three cases are described below.

Figure 5:
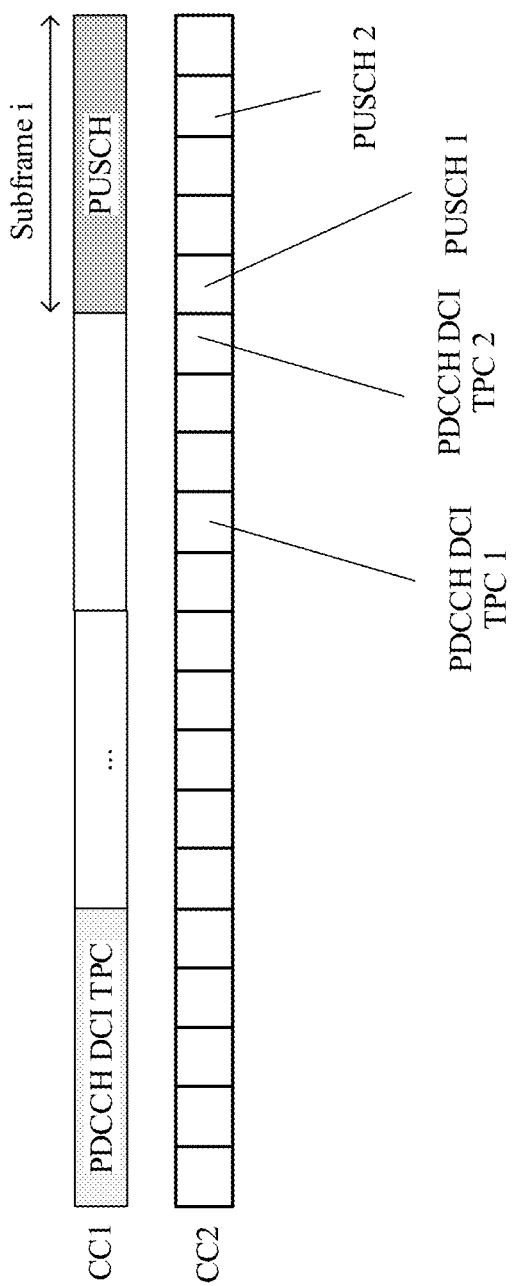
FIG. 5 is a schematic diagram of carrier alignment according to an embodiment of this disclosure.

Case 1: Sending of a first carrier and sending of a second carrier are aligned (as shown in FIG. 5), and the UE has determined all power requirements on the multiple second subframes before sending the first carrier.

In this case, the multiple second subframes of the second carrier jointly form a power indicator. For example, a PUSCH 1 and a PUSCH 2 in FIG. 5 jointly form a power indicator.

Case 2: Sending of a first carrier and sending of a second carrier are aligned (as shown in FIG. 5), and the UE has not determined all power requirements on all the multiple second subframes before sending the first carrier. In this case, the multiple second subframes of the second carrier jointly form a power indicator. For example, a PUSCH 1 and/or a PUSCH of a previous subframe in FIG. 5 jointly form/forms a power indicator.

Case 3: Sending of a first carrier and sending of a second carrier are not aligned (as shown in FIG. 6).

Figure 6:
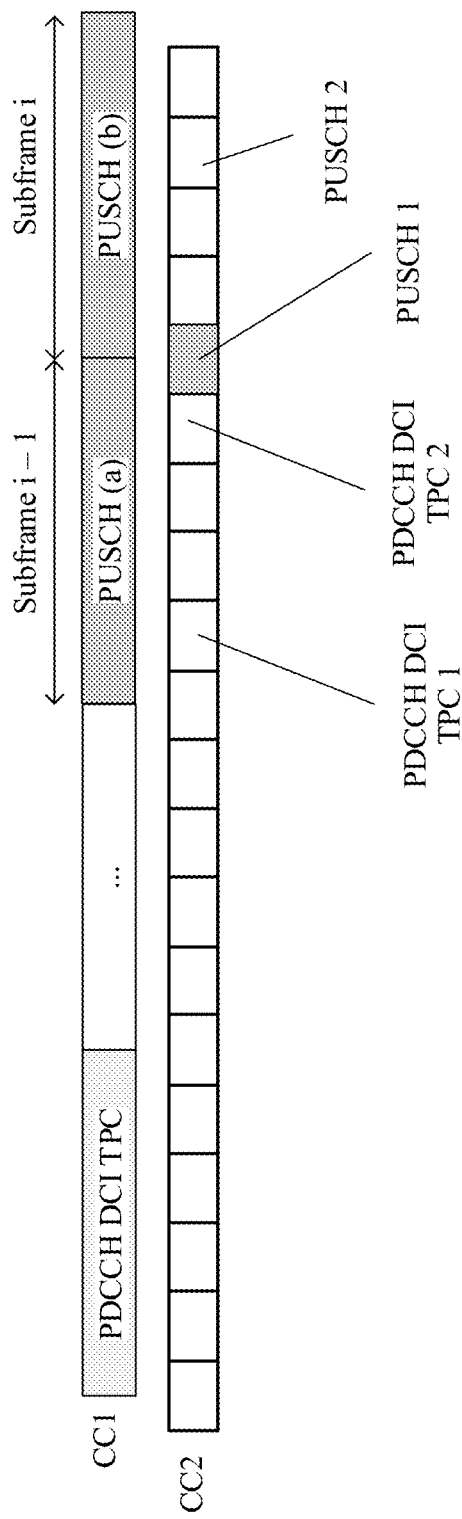
FIG. 6 is a schematic diagram of carrier non-alignment according to an embodiment of this disclosure.

Herein, in FIG. 6, a second subframe that transmits a PUSCH 1 may be corresponding to a first subframe that transmits a PUSCH (a), or may be corresponding to a first subframe that transmits a PUSCH (b). Alternatively, the second subframe that transmits the PUSCH 1 may be referred to as a left-and-right crossed subframe.

In this case, when a power indicator on multiple second subframes corresponding to a first subframe i−1 is calculated, the second subframe that transmits the PUSCH 1 may be calculated; and when a power indicator on the multiple second subframes corresponding to the first subframe i is calculated, the second subframe that transmits the PUSCH 1 is not calculated.

Alternatively, in this case, when a power indicator on multiple second subframes corresponding to a first subframe i−1 is calculated, the second subframe that transmits the PUSCH 1 may not be calculated; and when a power indicator on the multiple second subframes corresponding to the first subframe i is calculated, the second subframe that transmits the PUSCH 1 is calculated.

Alternatively, in this case, when a power indicator on multiple second subframes corresponding to a first subframe i−1 is calculated, the second subframe that transmits the PUSCH 1 may be calculated; and when a power indicator on the multiple second subframes corresponding to the first subframe i is calculated, the second subframe that transmits the PUSCH 1 is also calculated.

Correspondingly, for Case 3, when the power indicator $P_{req\_c2}(i)$ is calculated, N in the formula may be replaced with N+1.

Alternatively, in this case, when a power indicator on multiple second subframes corresponding to a first subframe i−1 is calculated, the second subframe that transmits the PUSCH 1 may not be calculated; and when a power indicator on the multiple second subframes corresponding to the first subframe i is calculated, the second subframe that transmits the PUSCH 1 is not calculated.

Correspondingly, for Case 3, when the power indicator $P_{req\_c2}(i)$ is calculated, N in the formula may be replaced with N−1.

It should be noted that in FIG. 5 and FIG. 6, one first subframe corresponds to five second subframes; and in FIG. 5 and FIG. 6, that the second subframe transmits the PUSCH 1 and the PUSCH 2 is merely presented as an example. Actually, one first subframe may be corresponding to more or fewer second subframes, and the second subframe may also transmit a PUCCH. This is not limited in this disclosure.

For different transmissions, processes of determining the transmit power in S130 are different. Multiple cases are separately described and analyzed below.

1. If the first subframe transmits a PRACH, and at least one second subframe (it is assumed that the at least one second subframe is a second subframe ix) of the N second subframes transmits a PRACH:

1.1 If the sum of the first power requirement and the power indicator is not greater than (that is, less than or equal to) the maximum transmit power, that is, if $P_{req\_c1}(i)+P_{PRACH,c2}(i) \leq P_{MAX}(i)$, the first power requirement is used as a transmit power on the first subframe, and the N second power requirements are separately used as transmit powers on the N second subframes.

1.2 If the sum of the first power requirement and the power indicator is greater than the maximum transmit power, that is, if $P_{req\_c1}(i)+P_{PRACH,c2}(i)>P_{MAX}(i)$, and $P_{req\_c1}(i)+P_{PRACH,c2}(ix) \leq P_{MAX}(i)$, the first power requirement (that is, $P_{req\_c1}(i)$) is used as a transmit power on the first subframe i, $P_{PRACH,c2}(ix)$ is used as a transmit power on the second subframe ix, $w_{c2,1}(ik) \times P_{PUCCH,c2}(ik)$ is used as a transmit power for transmitting a PUCCH on the second subframe ik, and $w_{c2,2}(ik) \times P_{PUSCH,c2}(ik)$ is used as a transmit power for transmitting a PUSCH on the second subframe ik, so that $w_{c2,1}(ik) \times P_{PUCCH,c2}(ik)+w_{c2,2}(ik) \times P_{PUSCH,c2}(ik) \leq P_{PRACH,c2}(ix)$, where $0 \leq w_{c2,1}(ik) \leq 1$, and $0 \leq w_{c2,2}(ik) \leq 1$.

In this case, that $w_{c2,1}(ik) \times P_{PUCCH,c2}(ik)+w_{c2,2}(ik) \times P_{PUSCH,c2}(ik) \leq P_{PRACH,c2}(ix)$ may be used as a condition for determining $w_{c2,1}(ik)$ and $w_{c2,2}(ik)$.

It may be learned that in this case, PRACH transmission on the first subframe is preferentially ensured, and only a transmit power on the second subframe is scaled, so that transmission efficiency can be improved while ensuring PRACH transmission on the first subframe.

1.3 If the sum of the first power requirement and the power indicator is greater than the maximum transmit power $P_{req\_c1}(i)+P_{PRACH,c2}(i)>P_{MAX}(i)$, and $P_{req\_c1}(i)+P_{PRACH,c2}(ix)>P_{MAX}(i)$, $w_{c1,1}(i) \times P_{req\_c1}(i)$ is used as a transmit power on the first subframe i, and $w_{c2,3}(ix) \times P_{PRACH,c2}(ix)$ is used as a transmit power on the second subframe ix, so that $w_{c1,1}(i) \times P_{req\_c1}(i)+w_{c2,3}(ix) \times P_{PRACH,c2}(ix) \leq P_{MAX}(i)$, where $0 \leq w_{c1,1}(i) \leq 1$, $0 \leq w_{c2,3}(ix) \leq 1$, and $w_{c1,1}(i)$ and $w_{c2,3}(ix)$ are not equal to 1 at the same time. In this case, that $w_{c1,1}(i) \times P_{req\_c1}(i)+w_{c2,3}(ix) \times P_{PRACH,c2}(ix) \leq P_{MAX}(i)$ may be used as a condition for determining $w_{c1,1}(i)$ and $w_{c2,3}(ix)$. It may be understood that in this case, $P_{PUCCH,c2}(ik)$ is used as a transmit power for transmitting a PUCCH on the second subframe ik, and $P_{PUSCH,c2}(ik)$ is used as a transmit power for transmitting a PUSCH on the second subframe ik.

It may be learned that in this case, both a PRACH transmit power on the first subframe and a PRACH transmit power on the second subframe are scaled, so that transmission efficiency can be improved while ensuring PRACH transmission.

2. If the first subframe transmits a PUCCH and/or a PUSCH, and at least one second subframe of the N second subframes transmits a PRACH:

2.1 If the sum of the first power requirement and the power indicator is not greater than (that is, less than or equal to) the maximum transmit power, the first power requirement is used as a transmit power on the first subframe, and the N second power requirements are separately used as transmit powers on the N second subframes.

2.2 If the sum of the first power requirement and the power indicator is greater than the maximum transmit power, that is, $P_{req\_c1}(i)+P_{PRACH,c2}(i)>P_{MAX}(i)$, $w_{c1,2}(i) \times P_{req\_c1}(i)$ is used as a transmit power on the first subframe i, and the N second power requirements are separately used as transmit powers on the N second subframes, so that $w_{c1,2}(i) \times P_{req\_c1}(i)+P_{PRACH,c2}(ix) \leq P_{MAX}(i)$, where $0 \leq w_{c1,2}(i) < 1$.

In this case, that $w_{c1,2}(i) \times P_{req\_c1}(i)+P_{PRACH,c2}(ix) \leq P_{MAX}(i)$ may be used as a condition for determining $w_{c1,2}(i)$.

It may be understood that in this case, $w_{c1,2}(i) \times P_{PUSCH,c1}(i)$ is used as a PUSCH transmit power on the first subframe i, and $w_{c1,2}(i) \times P_{PUCCH,c1}(i)$ is used as a PUCCH transmit power on the first subframe i.

It may be learned that in this case, PRACH transmission on the second subframe is preferentially ensured, and only a transmit power on the first subframe is scaled, so that transmission efficiency can be improved while ensuring PRACH transmission.

3. If the first subframe transmits a PRACH, and the N second subframes transmit a PUCCH and/or a PUSCH:

3.1 If the sum of the first power requirement and the power indicator is not greater than (that is, less than or equal to) the maximum transmit power, the first power requirement is used as a transmit power on the first subframe, and the N second power requirements are separately used as transmit powers on the N second subframes.

3.2 If $P_{req\_c1}(i)+P_{req\_c2}(i)>P_{MAX}(i)$, $P_{req\_c1}(i)$ is used as a transmit power on the first subframe i, and $w_{c2,4}(ij) \times P_{req\_c2}(ij)$ is used as a transmit power on the second subframe ij, so that $P_{req\_c1}(i)+w_{c2,4}(ij) \times P_{req\_c2}(i) \leq P_{MAX}(i)$, where $0 \leq w_{c2,4}(ij) < 1$.

In this case, $w_{c2,4}(ij) \times P_{PUSCH,c2}(ij)$ is used as a PUSCH transmit power on the second subframe ij, and $w_{c2,4}(ij) \times P_{PUCCH,c2}(ij)$ is used as a PUCCH transmit power on the second subframe ij. That $P_{req\_c1}(i)+w_{c2,4}(ij) \times P_{req\_c2}(i) \leq P_{MAX}(i)$ may be used as a condition for determining $w_{c2,4}(ij)$.

It may be learned that in this case, PRACH transmission on the first subframe is preferentially ensured, and only a transmit power on the second subframe is scaled, so that transmission efficiency can be improved while ensuring PRACH transmission.

The foregoing 1 to 3 are cases in which PRACH transmission is included. Other cases without PRACH transmission are described in detail below.

4. If the first subframe transmits a PUSCH and/or a PUCCH, and the multiple second subframes transmit a PUSCH and/or a PUCCH:

4.1 If the sum of the first power requirement and the power indicator is not greater than the maximum transmit power $P_{req\_c1}(i)+P_{req\_c2}(i) \leq P_{MAX}(i)$, the first power requirement is used as a transmit power on the first subframe i, and min$\{P_{req\_c2}(ij), P_{req\_c2}(i)\}$ is used as a transmit power on the second subframe ij.

Specifically, min$\{P_{PUCCH,c2}(ij), P_{PUCCH,c2}(i)\}$ is used as a PUCCH transmit power on the second subframe ij, and min$\{P_{PUSCH,c2}(ij), P_{PUSCH,c2}(i)\}$ is used as a PUSCH transmit power on the second subframe ij.

4.2 If the first subframe transmits a PUCCH, and at least one second subframe of the N second subframes transmits a PUCCH:

If the sum of the first power requirement and the power indicator is greater than the maximum transmit power $P_{req\_c1}(i)+P_{req\_c2}(i)>P_{MAX}(i)$, $w_{c1,3}(i) \times P_{req\_c1}(i)$ is used as a transmit power on the first subframe i, and min$\{P_{req\_c2}(ij), w_{c2,5}(i) \times P_{req\_c2}(i)\}$ is used as a transmit power on the second subframe ij, so that $w_{c1,3}(i) \times P_{req\_c1}(i)+w_{c2,5}(i) \times P_{req\_c2}(i) \leq P_{MAX}(i)$, where $0 \leq w_{c1,3}(i) \leq 1$, and $0 \leq w_{c2,5}(i) \leq 1$. Herein, $P_{req\_c1}(i)=P_{PUCCH,c1}(i)$, and $P_{req\_c2}(i)=P_{PUCCH,c2}(i)+P_{PUSCH,c2}(i)$. That $w_{c1,3}(i) \times P_{req\_c1}(i)+w_{c2,5}(i) \times P_{req\_c2}(i) \leq P_{MAX}(i)$ may be used as a condition for determining $w_{c1,2}(i)$ and $w_{c2,5}(i)$.

4.3 If the sum of the first power requirement and the power indicator is greater than the maximum transmit power $P_{req\_c1}(i)+P_{req\_c2}(i)>P_{MAX}(i)$, $P_{PUCCH,c1}(i)$ is used as a PUCCH transmit power on the first subframe i, $P_{PUCCH,c2}(ij)$ is used as a PUCCH transmit power on the second subframe ij, $w_{c1,4}(i) \times P_{PUSCH,c1}(i)$ is used as a PUSCH transmit power on the first subframe i, and min$\{P_{PUSCH,c2}(ij), w_{c2,6}(i) \times P_{PUSCH,c2}(i)+\max\{P_{PUCCH,c1}(i), P_{PUCCH,c2}(ij)\}-P_{PUCCH,c2}(ij)\}$ is used as a PUSCH transmit power on the second subframe ij, so that $w_{c1,4}(i) \times P_{PUSCH,c1}(i)+w_{c2,6}(i) \times P_{PUSCH,c2}(i) \leq P_{MAX}(i)-P_{PUCCH,c1}(i)-P_{PUCCH,c2}(ij)$, where $0 \leq w_{c1,4}(i) \leq 1$, and $0 \leq w_{c2,6}(i) < 1$.

Herein, $P_{req\_c1}(i)=P_{PUCCH,c1}(i)+P_{PUSCH,c1}(i)$, and $P_{req\_c2}(i)=P_{PUCCH,c2}(i)+P_{PUSCH,c2}(i)$. That $w_{c1,4}(i) \times P_{PUSCH,c1}(i)+w_{c2,6}(i) \times P_{PUSCH,c2}(i) \leq P_{MAX}(i)-P_{PUCCH,c1}(i)-P_{PUCCH,c2}(ij)$ may be used as a condition for determining $w_{c1,4}(i)$ and $w_{c2,6}(i)$.

It may be learned that in the case described in 4, a PUCCH transmit power is preferentially ensured, and a PUSCH transmit power is scaled. In this way, transmission efficiency can be improved while ensuring PUCCH transmission.

It should be noted that in the foregoing cases 1 to 4, unless otherwise specified, a PUSCH is a PUSCH that does not carry UCI.

5. If the first subframe transmits a PUSCH that carries UCI, the multiple second subframes transmit a PUSCH and/or a PUCCH, and the PUSCH transmitted by the second subframes does not carry UCI:

If the sum of the first power requirement and the power indicator is greater than the maximum transmit power $P_{req\_c1}(i)+P_{req\_c2}(i)>P_{MAX}(i)$, $P_{req\_c1}(i)$ is used as a transmit power on the first subframe i, $P_{PUCCH,c2}(ij)$ is used as a PUCCH transmit power on the second subframe ij, and min$\{P_{PUSCH,c2}(ij), w_{c2,7}(i) \times P_{PUSCH,c2}(i)+\max\{P_{PUCCH,c2}(i), P_{PUCCH,c2}(ij)\}-P_{PUCCH,c2}(ij)\}$ is used as a PUSCH transmit power on the second subframe ij, so that $w_{c2,7}(i) \times P_{PUSCH,c2}(i) \leq P_{MAX}(i)-P_{PUCCH,c1}(i)-P_{PUCCH,c2}(i)-P_{PUSCH,c1}(i)$, where $0 \leq w_{c2,7}(i) < 1$.

Herein, $P_{req\_c1}(i)=P_{PUSCH,c1}(i)$, and $P_{req\_c2}(i)=P_{PUCCH,c2}(i)+P_{PUSCH,c2}(i)$. That $w_{c2,7}(i) \times P_{PUSCH,c2}(i) \leq P_{MAX}(i)-P_{PUCCH,c1}(i)-P_{PUCCH,c2}(i)-P_{PUSCH,c1}(i)$ may be used as a condition for determining $w_{c2,7}(i)$.

It may be learned that in this case, a transmit power of a PUSCH that carries UCI on the first subframe and a PUCCH transmit power on the second subframe are preferentially ensured, and a PUSCH transmit power on the second subframe is scaled. In this way, transmission efficiency can be improved while ensuring transmission of a PUSCH that carries UCI and a PUCCH.

6. If the first subframe transmits a PUSCH and/or a PUCCH, and the PUSCH transmitted by the first subframe does not carry UCI; and the N second subframes transmit a PUSCH and/or a PUCCH, and at least one second subframe of the N second subframes transmits a PUSCH that carries UCI: For example, it may be assumed that a second subframe iy transmits a PUSCH that carries UCI.

If the sum of the first power requirement and the power indicator is greater than the maximum transmit power $P_{req\_c1}(i)+P_{req\_c2}(i)>P_{MAX}(i)$, $P_{PUCCH,c1}(i)$ is used as a PUCCH transmit power on the first subframe i, $P_{PUCCH,c2}(ij)$ is used as a PUCCH transmit power on the second subframe ij, $w_{c1,5}(i) \times P_{PUSCH,c1}(i)$ is used as a PUSCH transmit power on the first subframe i, and min$\{P_{PUSCH,c2}(ir), P'_{PUSCH,c2}(iy)+w_{c2,8}(i) \times P_{PUSCH,c2}(i)-P_{PUCCH,c2}(ir)\}$ is used as a PUSCH transmit power on a second subframe ir, so that $w_{c1,5}(i) \times P_{PUSCH,c1}(i)+w_{c2,8}(i) \times P_{PUSCH,c2}(i) \leq P_{MAX}(i)-P_{PUCCH,c1}(i)-P'_{PUSCH,c2}(iy)$. $P'_{PUSCH,c2}(iy)=\max\{P_{PUSCH,c2}(iy)+P_{PUCCH,c2}(iy)\}$, $0 \leq w_{c1,5}(i) \leq 1$, $0 \leq w_{c2,8}(i) < 1$, and ir represents a sequence number of a second subframe that is of the N second subframes and that does not transmit a PUSCH that carries UCI.

Herein, $P_{req\_c1}(i)=P_{PUSCH,c1}(i)+P_{PUCCH,c1}(i)$, and $P_{req\_c2}(i)=P_{PUCCH,c2}(i)+P_{PUSCH,c2}(i)$. That $w_{c1,5}(i) \times P_{PUSCH,c1}(i)+w_{c2,8}(i) \times P_{PUSCH,c2}(i) \leq P_{MAX}(i)-P_{PUCCH,c1}(i)-P'_{PUSCH,c2}(iy)$ may be used as a condition for determining $w_{c1,5}(i)$ and $w_{c2,8}(i)$.

It may be learned that in this case, a transmit power of a PUSCH that carries UCI and a PUCCH transmit power on the second subframe are preferentially ensured, and a transmit power of a PUSCH that does not carry UCI is scaled. In this way, transmission efficiency can be improved while ensuring transmission of a PUSCH that carries UCI and a PUCCH.

7. If the first subframe transmits a PUSCH that carries UCI, and at the same time, at least one second subframe of the N second subframes transmits a PUSCH that carries UCI: For example, it may be assumed that a second subframe iy transmits a PUSCH that carries UCI.

If $P'_{PUSCH,c2}(iy)+P_{PUSCH,c1}(i)+P_{PUCCH,c1}(i)>P_{MAX}(i)$, $w_{c1,6}(i) \times P_{PUSCH,c1}(i)$ is used as a PUSCH transmit power on the first subframe i, $w_{c1,6}(i) \times P_{PUCCH,c1}(i)$ is used as a PUCCH transmit power on the first subframe i, and $w_{c2,9}(i) \times P'_{PUSCH,c2}(iy)$ is used as a PUSCH transmit power on the second subframe iy, so that $w_{c1,6}(i) \times P_{PUSCH,c1}(i)+w_{c1,6}(i) \times P_{PUCCH,c1}(i)+w_{c2,9}(i) \times P'_{PUSCH,c2}(iy) \leq P_{MAX}(i)$. $P'_{PUSCH,c2}(iy)=\max\{P_{PUSCH,c2}(iy)+P_{PUCCH,c2}(iy)\}$, $0 \leq w_{c1,6}(i) \leq 1$, and $0 \leq w_{c2,9}(iy) < 1$. Herein, $P_{req\_c1}(i)=P_{PUSCH,c1}(i)+P_{PUCCH,c1}(i)$, and $P_{req\_c2}(i)=P_{PUCCH,c2}(i)+P_{PUSCH,c2}(i)$. In this case, that $w_{c1,6}(i) \times P_{PUSCH,c1}(i)+w_{c1,6}(i) \times P_{PUCCH,c1}(i)+w_{c2,9}(iy) \times P'_{PUSCH,c2}(iy) \leq P_{MAX}(i)$ may be used as a condition for determining $w_{c1,6}(i)$ and $w_{c2,9}(iy)$.

It may be learned that in this case, if a transmit power of a PUSCH that carries UCI cannot be ensured, all transmit powers are scaled.

It can be learned by analyzing the foregoing descriptions of the multiple cases that, in a power adjustment process, a priority of a PRACH is highest, followed by a PUSCH that carries UCI, then followed by a PUCCH, and finally followed by a PUSCH that does not carry UCI. When the sum of the first power requirement and the power indicator is greater than the maximum transmit power, a power of a PUSCH that does not carry UCI is first scaled. If an overall transmit power is still greater than the maximum transmit power after scaling is performed, a power of a PUCCH is scaled. A power of a PRACH is scaled only when the overall transmit power is still greater than the maximum transmit power after powers of a PUSCH and a PUCCH are scaled.

In this embodiment of this disclosure, the power indicator is determined for multiple subframes of the second cell, and then when the sum of the first power requirement and the power indicator is greater than the maximum transmit power, the first power requirement and/or the second power requirement are/is adjusted, so as to ensure that an overall transmission power is not greater than the maximum transmit power, so that transmission efficiency can be ensured.

It may be understood that in the foregoing descriptions of the multiple cases, a priority sequence is not set for the first cell and the second cell, or it may be considered that priorities of the first cell and the second cell are the same. In this case, transmission powers on the first cell and the second cell are determined mainly according to a signal transmitted by each cell. If a priority sequence is set for the first cell and the second cell, transmission powers on the first cell and the second cell may be determined according to a priority of the cell. Correspondingly, S130 in FIG. 4 may include the following cases.

In a look-ahead (look-ahead) case, that is, in a case in which a transmission status of a subsequent subframe is known:

If $P_{req\_c1}(i)+P_{req\_c2}(i) \leq P_{MAX}(i)$, it is determined that a transmit power on the first subframe i is $P_{req\_c1}(i)$, and it is determined that transmit powers on the N second subframes i1 to iN are $P_{req\_c2}(i)$.

If $P_{req\_c1}(i)+P_{req\_c2}(i)>P_{MAX}(i)$ and $P_{req\_c1}(i) \leq P_{c1}(i)$, it is determined that a transmit power on the first subframe i is $P_{req\_c1}(i)$, and it is determined that transmit powers on the N second subframes i1 to iN are $P_{MAX}(i)-P_{req\_c1}(i)$.

If $P_{req\_c1}(i)+P_{req\_c2}(i)>P_{MAX}(i)$ and $P_{req\_c2}(i) \leq \max\{P_{c2}(i1), \ldots, P_{c2}(iN)\}$, it is determined that a transmit power on the first subframe is $P_{MAX}(i)-P_{req\_c2}(i)$, and it is determined that transmit powers on the N second subframes are $P_{req\_c2}(i)$.

If $P_{req\_c1}(i)+P_{req\_c2}(i)>P_{MAX}(i)$, $P_{req\_c1}(i)>P_{c1}(i)$, and $P_{req\_c2}(i)>\max\{P_{c2}(i1), \ldots, P_{c2}(iN)\}$, it is determined that a transmit power on the first subframe is $P_{c1}(i)+P_{alloc\_c1}(i)$, and it is determined that transmit powers on the N second subframes are $P_{MAX}(i)-P_{c1}(i)-P_{alloc\_c1}(i)$.

If a priority of the first cell is higher than a priority of the second cell, $P_{alloc\_c1}(i)$ meets that $P_{alloc\_c1}(i)=\min\{P_{MAX}(i)-\max\{P_{c2}(i1), \ldots, P_{c2}(iN)\}-P_{c1}(i), P_{req\_c1}(i)-P_{c1}(i)\}$.

If a priority of the second cell is higher than a priority of the first cell, $P_{alloc\_c1}$ meets that $P_{alloc\_c1}(i)=\min\{P_{MAX}(i)-P_{c1}(i)-\min\{P_{MAX}(i)-P_{c1}(i), P_{req\_c2}(i)\}, P_{req\_c1}(i)-P_{c1}(i)\}$.

If a priority of the first cell is the same as a priority of the second cell, $P_{alloc\_c1}(i)$ meets that $P_{alloc\_c1}(i)=\times(P_{MAX}(i)-P_{c1}(i)-\max\{P_{c2}(i1), \ldots, P_{c2}(iN)\})$.

Alternatively, $P_{alloc\_c1}(i)$ meets that $$\frac{P_{alloc\_c1}(i)}{P_{MAX}(i) - P_{c1}(i) - \max\{P_{c2}(i1), \ldots, P_{c2}(iN)\} - P_{alloc\_c1}(i)} = \frac{P_{req\_c1}(i) - P_{c1}(i)}{P_{req\_c2}(i) - \max\{P_{c2}(i1), \ldots, P_{c2}(iN)\}}.$$

Alternatively, $P_{alloc\_c1}$ meets that $$\frac{P_{alloc\_c1}(i)}{P_{MAX}(i) - P_{c1}(i) - \max\{P_{c2}(i1), \ldots, P_{c2}(iN)\} - P_{alloc\_c1}(i)} = \frac{(P_{req\_c1}(i) - P_{c1}(i))/P_{c1}(i)}{(P_{req\_c2}(i) - \max\{P_{c2}(i1), \ldots, P_{c2}(iN)\})/\max\{P_{c2}(i1), \ldots, P_{c2}(iN)\}}.$$

Alternatively, $P_{alloc\_c1}$ meets that $$\frac{P_{alloc\_c1}(i)}{P_{MAX}(i) - P_{c1}(i) - \max\{P_{c2}(i1), \ldots, P_{c2}(iN)\} - P_{alloc\_c1}(i)} = \frac{P_{c1}(i)}{\max\{P_{c2}(i), \ldots, P_{c2}(iN)\}}.$$

$P_{c1}(i)$ and $P_{c2}(ij)$ are respectively a minimum guaranteed power on the first subframe i of the first cell and a minimum guaranteed power on the second subframe ij of the second cell, β is a remaining power allocation parameter, and the remaining power allocation parameter is preconfigured or the remaining power allocation parameter is pre-obtained by the UE from the base station. For example, the remaining power allocation parameter β may be sent by the base station (for example, a serving base station of the first cell) to the UE by using signaling; for example, the signaling may be DCI signaling.

It may be understood that before S130, minimum guaranteed powers $P_{c1}(i)$ and $P_{c2}(ij)$ may be respectively allocated to the first subframe i of the first cell and the N second subframes i1 to iN of the second cell, and any j meets that $P_{c1}(i)+P_{c2}(ij) \leq P_{MAX}(i)$. Further, a remaining power resource may be defined as $P_{remain\_power}(i)=P_{MAX}(i)-P_{c1}(i)-\max\{P_{c2}(i1), P_{c2}(i2), \ldots, P_{c2}(iN)\}$.

For example, a percentage may be indicated by using Table 6 shown below. For example, a base station of the first cell may send an indication 4 to the UE, so that the UE can determine that the minimum guaranteed power of the first subframe i of the first cell is 20% of a maximum power. For example, a base station of the second cell may send an indication 6 to the UE, so that the UE can determine that the minimum guaranteed power of the second subframe ij of the second cell is 37% of the maximum power. Alternatively, a same base station sends multiple minimum guaranteed power parameters, and different cells may use different power values.

TABLE 6

| p-MeNB or p-SeNB | Percentage |
| --- | --- |
| 0 | 0 |
| 1 | 5 |
| 2 | 10 |
| 3 | 15 |
| 4 | 20 |
| 5 | 30 |
| 6 | 37 |
| 7 | 44 |
| 8 | 50 |
| 9 | 56 |
| 10 | 63 |
| 11 | 70 |
| 12 | 80 |
| 13 | 90 |
| 14 | 95 |
| 15 | 100 |

First, it may be defined as $P_{c2}(i)=\max\{P_{c2}(i1), \ldots, P_{c2}(iN)\}$.

As another understanding, if $P_{req\_c1}(i)+P_{req\_c2}(i)>P_{MAX}(i)$, $P_{req\_c1}(i)>P_{c1}(i)$, and $P_{req\_c2}(i)>P_{c2}(i)$, the remaining power resource may be allocated according to the following rule.

In a case in which the priority of the first cell (for example, a low-frequency cell) is higher, a low-frequency priority needs to be ensured. Therefore, the remaining power resource may be allocated to the first cell, that is, $P'_{c1}(i)=\min\{P_{c1}(i)+P_{remain\_power}(i), P_{req\_c1}(i)\}$. Correspondingly, $P'_{c2}(i)=\min\{P_{MAX}(i)-P'_{c1}(i), P_{req\_c2}(i)\}$.

Figure 7:
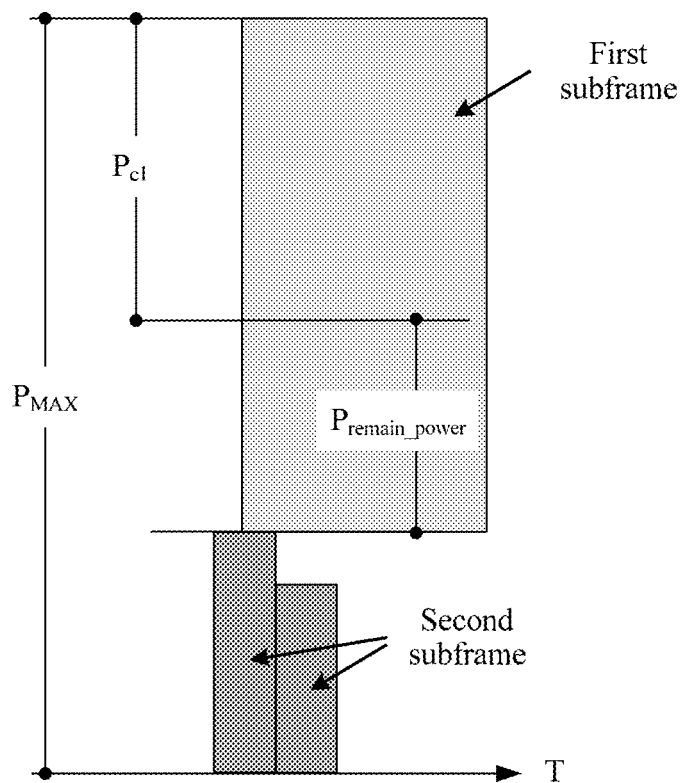
FIG. 7 is a schematic diagram of a transmit power according to an embodiment of this disclosure.

As shown in FIG. 7, a horizontal axis represents a time axis, and a vertical axis represents a magnitude of a power value. For example, FIG. 7 shows only two second subframes. Herein, the remaining power resource is allocated to the first subframe.

For example, if the first subframe transmits a PRACH or a PUCCH, and the second subframe transmits a PUSCH, it may be set that the priority of the first subframe is higher; or if the first subframe transmits a PUSCH that carries DCI, and the second subframe transmits a PUSCH that does not carry DCI, it may be set that the priority of the first subframe is higher.

In a case in which the priority of the second cell (for example, a high-frequency cell) is higher, a high-frequency priority needs to be ensured. Therefore, the remaining power resource may be allocated to the second cell, that is, $P'_{c2}(i)=\min\{P_{c2}(i)+P_{remain\_power}(i), P_{req\_c2}(i)\}$. Correspondingly, $P'_{c1}(i)=\min\{P_{MAX}(i)-P'_{c2}(i), P_{req\_c1}(i)\}$.

Figure 8:
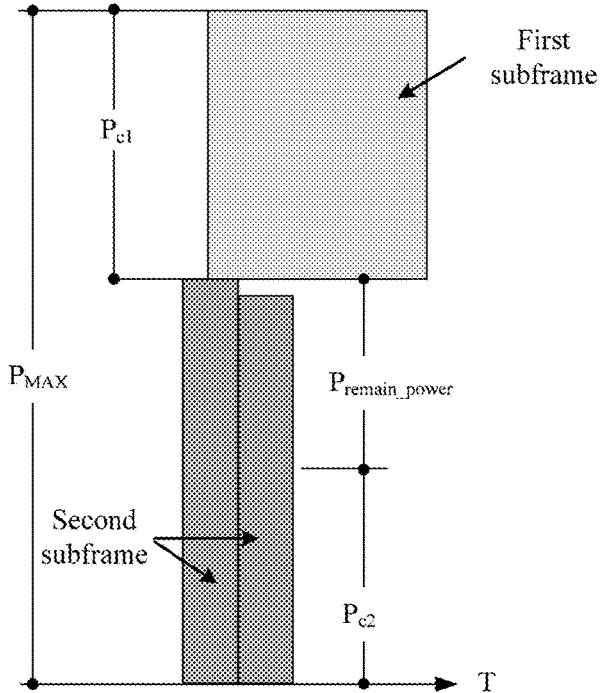
FIG. 8 is another schematic diagram of a transmit power according to an embodiment of this disclosure.

As shown in FIG. 8, a horizontal axis represents a time axis, and a vertical axis represents a magnitude of a power value. For example, FIG. 8 shows only two second subframes. Herein, the remaining power resource is allocated to the second subframe.

For example, if the first subframe transmits a PUCCH and/or a PUSCH, and one or some subframes of the second subframes transmit a PRACH, it may be set that the priority of the second subframe is higher; if the first subframe transmits a PUSCH, and one or some subframes of the second subframes transmit a PUCCH, it may be set that the priority of the second subframe is higher; or if the first subframe transmits a PUSCH that does not carry DCI, and one or some subframes of the second subframes transmit a PUSCH that carries DCI, it may be set that the priority of the second subframe is higher.

In a case in which a priority is not set or the first cell and the second cell have same priorities, the remaining power resource may be allocated to the first cell and the second cell according to a specific proportion. It is assumed that in the remaining power resource, a power allocated to the first cell is $P_{alloc\_c1}(i)$, a power allocated to the second cell is $P_{alloc\_c2}(i)$, and $P_{alloc\_c1}(i)+P_{alloc\_c2}(i)=P_{remain\_power}(i)_r$. Therefore, transmit powers $P'_{c1}(i)$ and $P'_{c2}(i)$ in S130 may be determined: $P'_{c1}(i)=P_{c1}(i)+P_{alloc\_c1}(i)$, and $P'_{c2}(i)=P_{c2}(i)+P_{alloc\_c2}(i)$.

For example, the remaining power resource may be allocated according to a proportion of an exceeded part, that is, $P_{remain\_c1}(i)$ and $P_{remain\_c2}(i)$ may be determined according to the following formula:

$$\frac{P_{alloc\_c1}(i)}{P_{alloc\_c2}(i)} = \frac{P_{req\_c1}(i)-P_{c1}(i)}{P_{req\_c2}(i)-P_{c2}(i)}.$$

It may be understood that the exceeded part is a part of a power requirement that exceeds the minimum guaranteed power.

For another example, the remaining power resource may be allocated according to a proportion of a configuration power, that is, $P_{remain\_c1}(i)$ and $P_{remain\_c2}(i)$ may be determined according to the following formula:

$$\frac{P_{alloc\_c1}(i)}{P_{alloc\_c2}(i)} = \frac{P_{c1}(i)}{P_{c2}(i)}.$$

It may be understood that the configuration power is the minimum guaranteed power.

For another example, the remaining power resource may be allocated according to a proportion of an exceeded part in a configuration power, that is, $P_{remain\_c1}(i)$ and $P_{remain\_c2}(i)$ may be determined according to the following formula:

$$\frac{P_{alloc\_c1}(i)}{P_{alloc\_c2}(i)} = \frac{(P_{req\_c1}(i)-P_{c1}(i))/P_{c1}(i)}{(P_{req\_c2}(i)-P_{c2}(i))/P_{c2}(i)}.$$

It may be understood that the exceeded part is a part of a power requirement that is greater than the minimum guaranteed power.

For another example, the remaining power resource may be allocated according to a proportion β that is predefined or that is configured by the base station, that is, $P_{remain\_c1}(i)$ and $P_{remain\_c2}(i)$ may be determined according to the following formula:

$$P_{remain\_c1}(i)=\beta \times P_{remain\_power}(i), P_{remain\_c2}(i)=(1-\beta) \times P_{remain\_power}(i).$$

It may be learned that in this embodiment, the remaining power resource is allocated to the first cell and the second cell according to a priority status or according to different proportions. In this way, it can be ensured that the overall transmission power is not greater than the maximum transmit power, and service transmission is ensured. In addition, a power resource can be fully used.

In a non-look-ahead (non-look-ahead) case, that is, in a case in which not all transmission statuses of a subsequent subframe are known:

If sending of the first cell and sending of the second cell are aligned (as shown in FIG. 5), the foregoing descriptions of the look-ahead case may be used to determine the transmit powers $P'_{c1}(i)$ and $P'_{c2}(i)$ on the first subframe and the second subframe.

If the priority is not set or the first cell and the second cell have same priorities, the foregoing descriptions of the look-ahead case may be used to determine the transmit powers $P'_{c1}(i)$ and $P'_{c2}(i)$ on the first subframe and the second subframe. For example, the remaining power resource may be allocated to the first cell and the second cell according to a specific rule.

Figure 9:
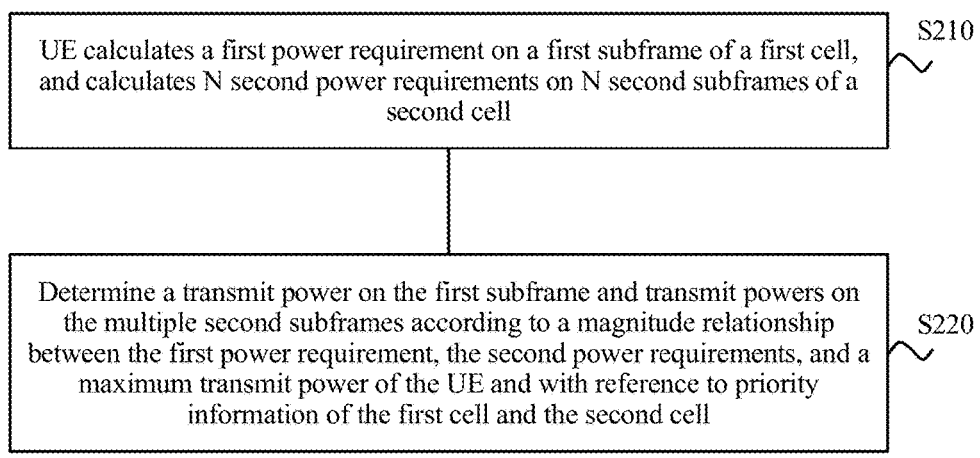
FIG. 9 is another flowchart of a power determining method according to an embodiment of this disclosure.

In the non-look-ahead case, if sending of the first cell and sending of the second cell are not aligned (as shown in FIG. 6), and the first cell and the second cell have different priorities, the transmit power may be determined according to a sending sequence and the priorities. Specifically, as shown in FIG. 9, the method includes the following steps:

S210. UE calculates a first power requirement on a first subframe of a first cell, and calculates N second power requirements on N second subframes of a second cell.

S220. Determine a transmit power on the first subframe and transmit powers on the multiple second subframes according to a magnitude relationship between the first power requirement, the N second power requirements, and a maximum transmit power of the UE and with reference to priority information of the first cell and the second cell.

It may be understood that a power requirement is an actually required power, a power allocated by a TPC command, or the like.

In S210, the UE may calculate the power requirement by using a method in the prior art. It is assumed that the first subframe corresponds to the N second subframes. The first power requirement may be denoted as $P_{req\_c1}(i)$, and the second power requirements may be denoted as $P_{req\_c2}(ij)$, where a value range of j is 1 to N, and N is a positive integer greater than 1.

In addition, the maximum transmit power of the UE may be denoted as $P_{MAX}(i)$.

Optionally, for S210 in the embodiment shown in FIG. 9, refer to S110 in the foregoing embodiment shown in FIG. 4. To avoid repetition, details are not described herein again.

In S220, if a priority of the first cell is higher than a priority of the second cell, it may be determined that a transmit power on a second subframe i1 sent before the first subframe is $\min\{P_{req\_c2}(i1), P_{c2}(i1)\}$, it may be determined that the transmit power on the first subframe i is $\min\{P_{MAX}(i)-\min\{P_{req\_c2}(i1), P_{c2}(i1)\}, P_{req\_c1}(i)\}$, and it may be determined that a transmit power on a second subframe ik is $\min\{P_{MAX}(i)-\min\{P_{MAX}(i)-\min\{P_{req\_c2}(i1), P_{c2}(i1)\}, P_{req\_c1}(i)\}, P_{req\_c2}(ik)\}$. Herein, a value range of k is 2 to N.

Figure 10:
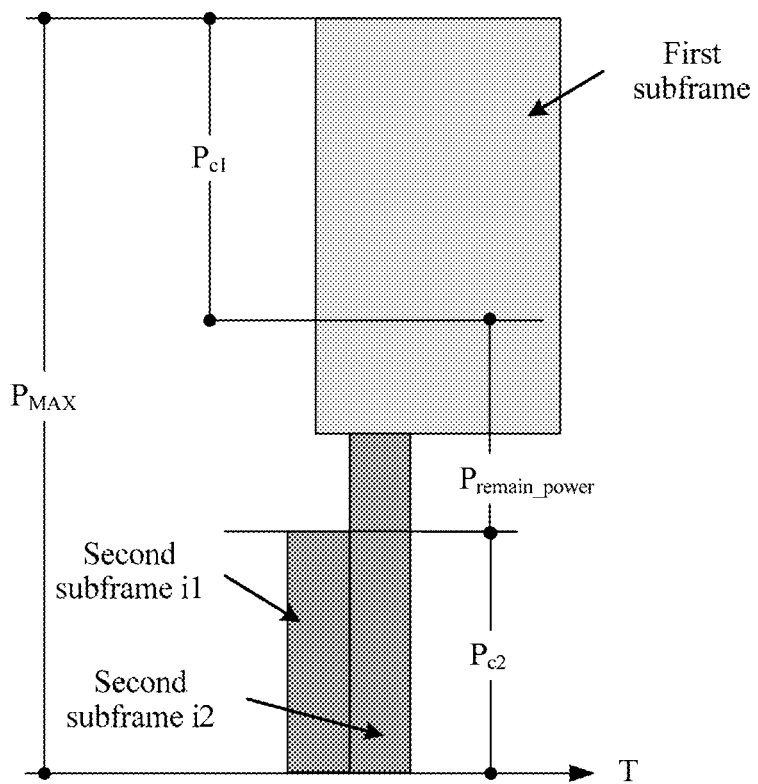
FIG. 10 is another schematic diagram of a transmit power according to an embodiment of this disclosure.

As shown in FIG. 10, because a priority of the first subframe is higher, the transmit power on the second subframe i1 sent first is a minimum value. FIG. 10 shows that the minimum value is $P_{c2}(i1)$, that is, $P_{c2}(i1) < P_{req\_c2}(i1)$. In this way, the transmit power on the first subframe i sent later can be ensured. After the first subframe i is sent, for the second subframes i2 to iN, similar to a look-ahead case, the transmit power on the second subframe ik may be determined according to a transmit power used by the corresponding first subframe i.

It should be noted that referring to the foregoing descriptions related to FIG. 6, a first second subframe shown in FIG. 10 may be corresponding to a first subframe i−1, that is, numbers of two second subframes in FIG. 10 may be separately (i−1)N and i1. That is, a left-and-right crossed second subframe shown in FIG. 10 corresponds to the first subframe i, and actually, may also be corresponding to the first subframe i−1.

If a priority of the second cell is higher than a priority of the first cell, it may be determined that the transmit power on the first subframe i is $\min\{P_{req\_c1}(i), P_{c1}(i)\}$, it may be determined that a transmit power on a second subframe ik is $\min\{P_{MAX}(i)-\min\{P_{req\_c1}(i), P_{c1}(i)\}, P_{req\_c2}(ik)\}$, and it may be determined that a transmit power on a second subframe (i+1) 1 is $\min\{P_{MAX}(i+1)-P_{c1}(i+1), \min\{P_{MAX}(i)-\min\{P_{req\_c1}(i), P_{c1}(i)\}\}, P_{req\_c2}((i+1)\,1)\}$.

Figure 11:
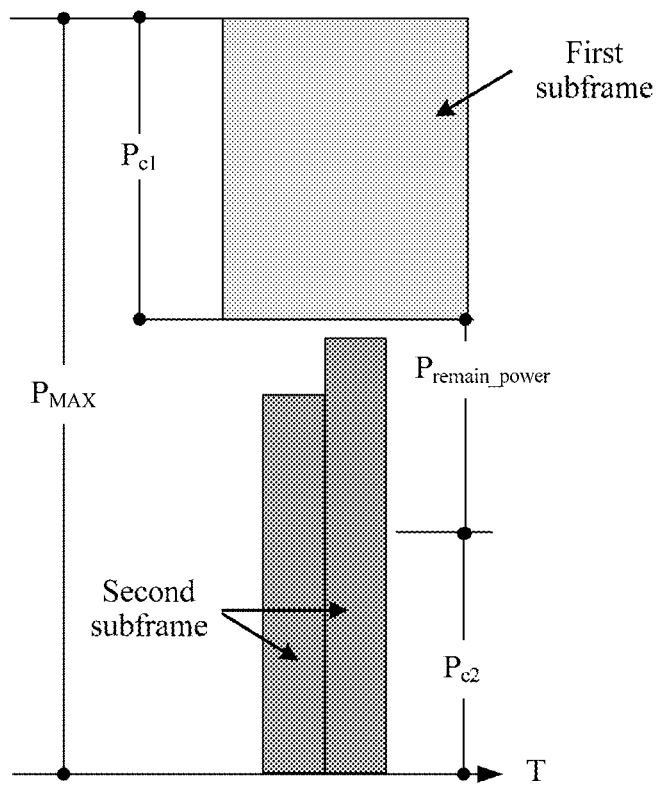
FIG. 11 is another schematic diagram of a transmit power according to an embodiment of this disclosure.

As shown in FIG. 11, because the first subframe i is sent before the second subframe ik, the transmit power on the first subframe i sent first is a minimum value. FIG. 11 shows that the minimum value is $P_{c1}(i)$, that is, $P_{c1}(i) < P_{req\_c1}(i)$. In this way, the transmit power on the second subframe ik sent later can be ensured. After the first subframe i is sent, for the second subframes i2 to iN, similar to a look-ahead case, the transmit power on the second subframe ik may be determined according to a transmit power used by the corresponding first subframe i.

Herein, the transmit power on the second subframe i1 may be determined according to a transmit power on the first subframe i−1. It is assumed that the transmit power on the first subframe i−1 is $P'_{c1}(i-1) = \min\{P_{req\_c1}(i-1), P_{c1}(i-1)\}$. The transmit power on the second subframe i1 may be $P'_{c2}(i) = \min\{P_{MAX}(i)-P_{c1}(i), \min\{P_{MAX}(i-1)-\min\{P_{req\_c1}(i-1), P_{c1}(i-1)\}\}, P_{req\_c2}(i1)\}$. Similarly, the transmit power on the second subframe (i+1) 1 may be $\min\{P_{MAX}(i+1)-P_{c1}(i+1), \min\{P_{MAX}(i)-\min\{P_{req\_c1}(i), P_{c1}(i)\}\}, P_{req\_c2}((i+1)\,1)\}$ that is determined by the transmit power on the first subframe i.

In this embodiment, for a low-priority subframe sent first (for example, the second subframe i1 in FIG. 10 and the first subframe i in FIG. 11), it may be determined that a transmit power is a minimum value. In this way, a transmit power on a high-priority subframe (for example, the first subframe i in FIG. 10 and the second subframe ik in FIG. 11) sent later can be ensured, and sending efficiency can be ensured.

Optionally, in another embodiment, the transmit power on the first subframe of the first cell may not be constant.

Specifically, transmit powers on different symbols of the first subframe may be different.

Optionally, S220 may include: determining that the transmit powers on the second subframes are the second power requirements, and determining a transmit power on each symbol of the first subframe, so that an overall transmit power is less than or equal to the maximum transmit power.

Specifically, it may be first determined that a transmit power on a second subframe ij is $P'_{c2}(ij)$, and then it is determined that a transmit power on a symbol that is on the first subframe i and that corresponds to the second subframe ij is $\min\{P_{c1}(i), P_{MAX}(i)-P'_{c2}(ij)\}$. In this way, it can be ensured that at any moment t, a sum of the transmit power on the first subframe and the transmit power on the second subframe is not greater than the maximum transmit power.

That is, the transmit powers on the different symbols of the first subframe i may be the same or different. When a transmit power on a symbol a of the first subframe i is determined, a second subframe corresponding to the symbol a may be determined first. It is assumed that the second subframe corresponding to the symbol a is the second subframe ij. The transmit power on the symbol a may be determined according to the transmit power $P'_{c2}(ij)$ on the second subframe ij.

It should be noted that if the symbol a corresponds to multiple second subframes, correspondingly, there are multiple $P_{MAX}(i)-P'_{c2}(ij)$ in the foregoing formula. For example, if second subframes corresponding to a symbol 1 includes a second subframe i1, a second subframe i2, and a second subframe i3, a transmit power on the symbol 1 is $\min\{P_{c1}(i), P_{MAX}(i)-P'_{c2}(i1), P_{MAX}(i)-P'_{c2}(i2), P_{MAX}(i)-P'_{c2}(i3)\}$.

Figure 12:
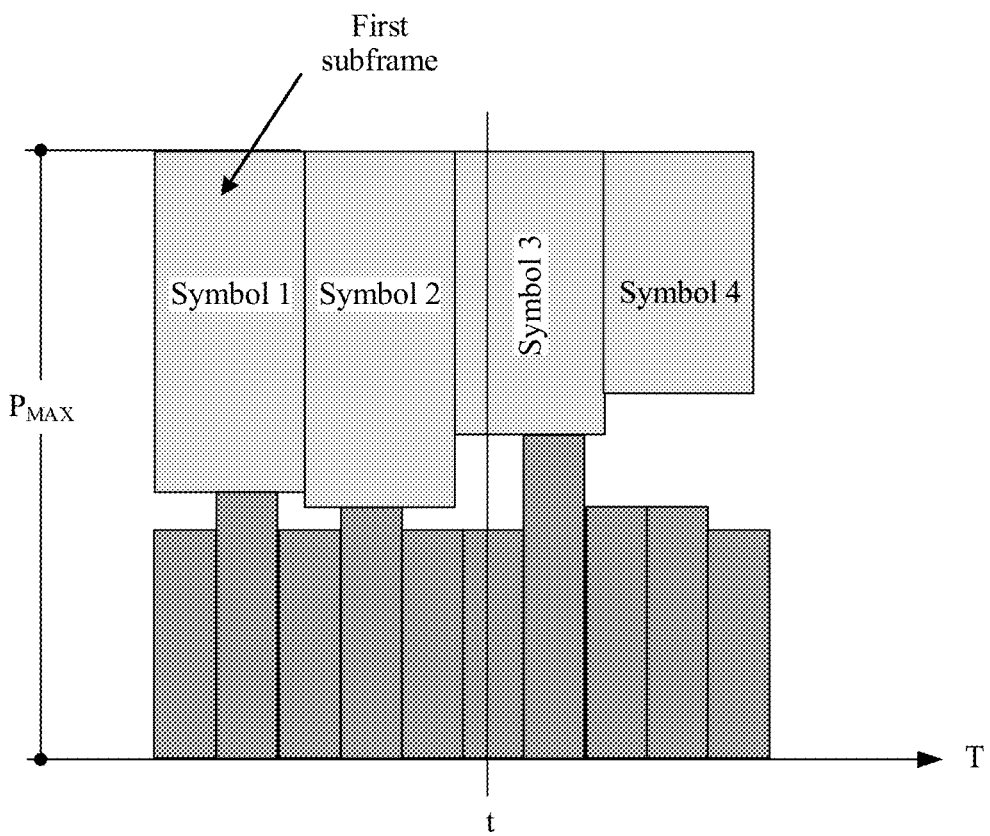
FIG. 12 is another schematic diagram of a transmit power according to an embodiment of this disclosure.

As shown in FIG. 12, transmit powers on a symbol 1, a symbol 2, a symbol 3, and a symbol 4 of the first subframe are separately determined according to a transmit power on a respective corresponding second subframe. Therefore, the transmit powers on the four symbols are not equal to each other.

It may be learned that in this embodiment, symbol-level power control is performed on the first cell (it is assumed that the first cell is a low-frequency cell), so that quick power control on the first cell can be implemented, and power allocation rationality can be improved.

In this embodiment of this disclosure, transmit powers on the first cell and the second cell are determined according to a priority, so that transmission of a high-priority cell can be preferentially ensured, and transmission quality and transmission efficiency can be improved.

In this embodiment of this disclosure, $w_{c1,1}(i)$, $w_{c1,2}(i)$, $w_{c1,3}(i)$, $w_{c1,4}(i)$, $w_{c1,5}(i)$, and $w_{c1,6}(i)$ may be understood as a scaling factor on the first subframe i of the first cell, and the scaling factor is used to determine the transmit power on the first subframe i according to the first power requirement. $w_{c2,1}(ik)$, $w_{c2,2}(ik)$, $w_{c2,3}(ix)$, $w_{c2,4}(ij)$, $w_{c2,5}(i)$, $w_{c2,6}(i)$, $w_{c2,7}(i)$, $w_{c2,8}(i)$, and $w_{c2,9}(iy)$ may be understood as a scaling factor on a corresponding second subframe of the second cell, and the scaling factor is used to determine the transmit power on the second subframe according to the second power requirement or the power indicator.

Figure 13:
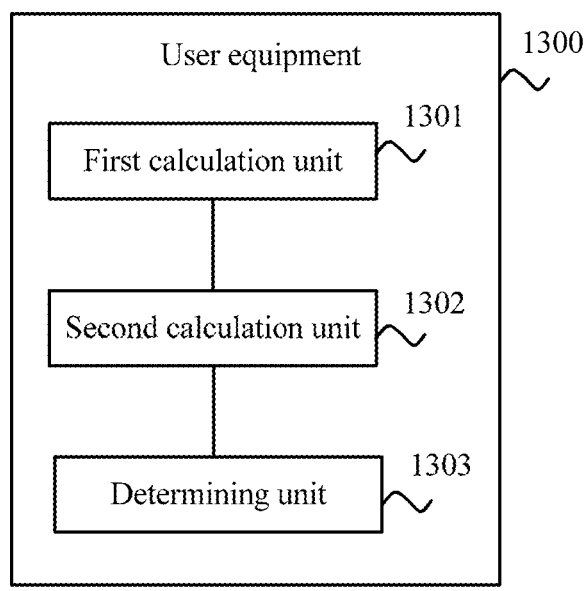
FIG. 13 is a structural block diagram of user equipment according to an embodiment of this disclosure.

In this embodiment of this disclosure, $w_{c1,1}(i)$, $w_{c1,2}(i)$, $w_{c1,3}(i)$, $w_{c1,4}(i)$, $w_{c1,5}(i)$, and $w_{c1,6}(i)$, and $w_{c2,1}(ik)$, $w_{c2,2}(ik)$, $w_{c2,3}(ix)$, $w_{c2,4}(ij)$, $w_{c2,5}(i)$, $w_{c2,6}(i)$, $w_{c2,7}(i)$, $w_{c2,8}(i)$, and $w_{c2,9}(iy)$ may be predefined, or may be obtained by means of calculation by the UE, or may be configured by a base station. It should be understood that the scaling factor on the first subframe i of the first cell and the scaling factor on the corresponding second subframe of the second cell may be different, that is, different carriers may be configured with different scaling factors. FIG. 13 is a structural block diagram of user equipment according to an embodiment of this disclosure. UE 1300 shown in FIG. 13 is configured with multiple cells, and a first subframe of a first cell corresponds to N second subframes of a second cell. The UE 1300 includes a first calculation unit 1301, a second calculation unit 1302, and a determining unit 1303.

The first calculation unit 1301 is configured to calculate a first power requirement on the first subframe, and calculate N second power requirements on the N second subframes.

The second calculation unit 1302 is configured to calculate a power indicator on the N second subframes according to the N second power requirements calculated by the first calculation unit 1301.

The determining unit 1303 is configured to determine transmit powers on the first subframe and the N second subframes according to a magnitude relationship between a maximum transmit power and a sum of the first power requirement calculated by the first calculation unit 1301 and the power indicator calculated by the second calculation unit 1302.

It is assumed that the first subframe corresponds to the N second subframes, the first subframe is denoted as a subframe i, the multiple second subframes are denoted as subframes i1, i2, . . . , and iN, the first power requirement is denoted as $P_{req\_c1}(i)$, the second power requirement is denoted as $P_{req\_c2}(ij)$, and the maximum transmit power corresponding to the first subframe i is denoted as $P_{MAX}(i)$. A value range of j is 1 to N, and N is a positive integer greater than 1.

Optionally, in an embodiment, if at least one second subframe of the N second subframes transmits a PRACH, $P_{req\_c2}(ik)=P_{PUCCH,c2}(ik)+P_{PUSCH,c2}(ik)$, and $P_{req\_c2}(ix)=P_{PRACH,c2}(ix)$, where ik represents a sequence number of a second subframe that is of the N second subframes and that does not transmit a PRACH, and ix represents a sequence number of a second subframe that transmits a PRACH.

The second calculation unit 1302 is specifically configured to denote the power indicator as $P_{PRACH,c2}(i)$, and $P_{PRACH,c2}(i)=\max\{P_{PUCCH,c2}(ik)+P_{PUSCH,c2}(ik), P_{PRACH,c2}(ix)\}$, or $P_{PRACH,c2}(i)=\min\{P_{PUCCH,c2}(ik)+P_{PUSCH,c2}(ik), P_{PRACH,c2}(ix)\}$, or $P_{PRACH,c2}(i)=\gamma_{c2}(ik)\times(P_{PUCCH,c2}(ik)+P_{PUSCH,c2}(ik))+\gamma_{c2}(ix)\times P_{PRACH,c2}(ix)$, or $P_{PRACH,c2}(i)=\max\{P_{PRACH,c2}(ix)\}$, or $P_{PRACH,c2}(i)=\min\{P_{PRACH,c2}(ix)\}$.

max represents using a maximum value, min represents using a minimum value, $\gamma_{c2}(ik)$ represents a scaling factor of a second subframe ij, and $0 \leq \gamma_{c2}(ij) \leq 1$.

If at least one second subframe of the N second subframes transmits a PRACH, and the first subframe transmits a PRACH, correspondingly, the determining unit 1303 is specifically configured to:

if $P_{req\_c1}(i)+P_{PRACH,c2}(i)>P_{MAX}(i)$, and $P_{req\_c1}(i)+P_{PRACH,c2}(ix)\leq P_{MAX}(i)$, use the first power requirement as a transmit power on the first subframe, use $P_{PRACH,c2}(ix)$ as a transmit power on a second subframe ix, use $w_{c2,1}(ik)\times P_{PUCCH,c2}(ik)$ as a transmit power for transmitting a PUCCH on a second subframe ik, and use $w_{c2,2}(ik)\times P_{PUSCH,c2}(ik)$ as a transmit power for transmitting a PUSCH on the second subframe ik, so that $w_{c2,1}(ik)\times P_{PUCCH,c2}(ik)+w_{c2,2}(ik)\times P_{PUSCH,c2}(ik)\leq P_{PRACH,c2}(ix)$, where $0\leq w_{c2,1}(ik)\leq 1$, and $0\leq w_{c2,2}(ik)\leq 1$; or if $P_{req\_c1}(i)+P_{PRACH,c2}(i)>P'_{MAX}(i)$, and $P_{req\_c1}(i)+P_{PRACH,c2}(ix)>P_{MAX}(i)$, use $w_{c1,1}(i)\times P_{req\_c1}(i)$ as a transmit power on the first subframe i, and use $w_{c2,3}(ix)\times P_{PRACH,c2}(ix)$ as a transmit power on a second subframe ix, so that $w_{c1,1}(i)\times P_{req\_c1}(i)+w_{c2,3}(ix)\times P_{PRACH,c2}(ix)\leq P_{MAX}(i)$, where $0\leq w_{c1,1}(i)\leq 1$, and $0\leq w_{c2,3}(ix)\leq 1$.

If at least one second subframe of the N second subframes transmits a PRACH, and the first subframe transmits a PUCCH and/or a PUSCH, correspondingly, the determining unit 1303 is specifically configured to: if $P_{req\_c1}(i)+P_{PRACH,c2}(i)>P_{MAX}(i)$, use $w_{c1,2}(i)\times P_{req\_c1}(i)$ as a transmit power on the first subframe i, and separately use the N second power requirements as transmit powers on the N second subframes, so that $w_{c1,2}(i)\times P_{req\_c1}(i)+P_{PRACH,c2}(ix)\leq P_{MAX}(i)$, where $0\leq w_{c1,2}(i)<1$.

Optionally, in another embodiment, if at least one second subframe of the N second subframes transmits a PUCCH and/or a PUSCH, $P_{req\_c2}(ij)=P_{PUCCH,c2}(ij)+P_{PUSCH,c2}(ij)$.

The second calculation unit 1302 is specifically configured to:

denote the power indicator as $P_{req\_c2}(i)$, and calculate the power indicator by using the following formula:

$$P_{req\_c2}(i)=P_{PUCCH,c2}(i)+P_{PUSCH,c2}(i).$$

$P_{PUCCH,c2}(i)$ represents a PUCCH power indicator on the N second subframes.

$$P_{PUCCH,c2}(i)=\max\{P_{PUCCH,c2}(i1),P_{PUCCH,c2}(i2),\ldots,P_{PUCCH,c2}(iN)\};\text{ or}$$

$$P_{PUCCH,c2}(i)=\min\{P_{PUCCH,c2}(i1),P_{PUCCH,c2}(i2),\ldots,P_{PUCCH,c2}(iN)\};\text{ or}$$

$$P_{PUCCH,c2}(i)=\alpha\times(P_{PUCCH,c2}(i1)+P_{PUCCH,c2}(i2)+\ldots+P_{PUCCH,c2}(iN)).$$

$P_{PUSCH,c2}(i)$ represents a PUSCH power indicator on the N second subframes.

$$P_{PUSCH,c2}(i)=\max\{P_{PUSCH,c2}(i1),P_{PUSCH,c2}(i2),\ldots,P_{PUSCH,c2}(iN)\};\text{ or}$$

$$P_{PUSCH,c2}(i)=\min\{P_{PUSCH,c2}(i1),P_{PUSCH,c2}(i2),\ldots,P_{PUSCH,c2}(iN)\};\text{ or}$$

$$P_{PUSCH,c2}(i)=\alpha\times(P_{PUSCH,c2}(i1)+P_{PUSCH,c2}(i2)+\ldots+P_{PUSCH,c2}(iN)).$$

max represents using a maximum value, min represents using a minimum value, $\alpha$ is a power parameter, and the power parameter is preconfigured or the power parameter is pre-obtained by the UE from a base station.

Alternatively, the second calculation unit 1302 is specifically configured to:

denote the power indicator as $P_{req\_c2}(i)$, and calculate the power indicator by using the following formula:

$$P_{req\_c2}(i)=\max\{P_{req\_c2}(i1),P_{req\_c2}(i2),\ldots,P_{req\_c2}(iN)\};\text{ or}$$

$$P_{req\_c2}(i)=\min\{P_{req\_c2}(i1),P_{req\_c2}(i2),\ldots,P_{req\_c2}(iN)\};\text{ or}$$

$$P_{req\_c2}(i)=\alpha\times(P_{req\_c2}(i1)+P_{req\_c2}(i2)+\ldots+P_{req\_c2}(iN)).$$

max represents using a maximum value, min represents using a minimum value, $\alpha$ is a power parameter, and the power parameter is preconfigured or the power parameter is pre-obtained by the UE from a base station.

If at least one second subframe of the N second subframes transmits a PUCCH and/or a PUSCH, and the first subframe transmits a PRACH, correspondingly, the determining unit 1303 is specifically configured to:

if $P_{req\_c1}(i)+P_{req\_c2}(i)>P_{MAX}(i)$, use $P_{req\_c1}(i)$ as a transmit power on the first subframe i, and use $w_{c2,4}(ij)\times P_{req\_c2}(ij)$ as a transmit power on a second subframe ij, so that $P_{req\_c1}(i)+w_{c2,4}(ij)\times P_{req\_c2}(i) \leq P_{MAX}(i)$, where $0 \leq w_{c2,4}(ij)<1$.

If at least one second subframe of the N second subframes transmits a PUCCH and/or a PUSCH, and the first subframe transmits a PUCCH and/or a PUSCH, correspondingly, the determining unit 1303 is specifically configured to:

when $P_{req\_c1}(i)+P_{req\_c2}(i) \leq P_{MAX}(i)$, use $P_{req\_c1}(i)$ as a transmit power on the first subframe i, and use $\min\{P_{req\_c2}(ij), P_{req\_c2}(i)\}$ as a transmit power on a second subframe ij.

The determining unit 1303 is specifically configured to use $\min\{P_{PUCCH,c2}(ij), P_{PUCCH,c2}(i)\}$ as a PUCCH transmit power on the second subframe ij, and use $\min\{P_{PUSCH,c2}(ij), P_{PUSCH,c2}(i)\}$ as a PUSCH transmit power on the second subframe ij.

If the first subframe transmits a PUCCH, and at least one second subframe of the N second subframes transmits a PUCCH, correspondingly, the determining unit 1303 is specifically configured to:

when $P_{req\_c1}(i)+P_{req\_c2}(i)>P_{MAX}(i)$, use $w_{c1,3}(i)\times P_{req\_c1}(i)$ as a transmit power on the first subframe i, and use $\min\{P_{req\_c2}(ij), w_{c2,5}(i)\times P_{req\_c2}(i)\}$ as a transmit power on a second subframe ij, so that $w_{c1,3}(i)\times P_{req\_c1}(i)+w_{c2,5}(i)\times P_{req\_c2}(i) \leq P_{MAX}(i)$, where $0<w_{c1,3}(i)<1$, and $0 \leq w_{c2,5}(i)<1$.

If at least one second subframe of the N second subframes transmits a PUCCH and/or a PUSCH, and the first subframe transmits a PUCCH and/or a PUSCH, correspondingly, the determining unit 1303 is specifically configured to:

when $P_{req\_c1}(i)+P_{req\_c2}(i)>P_{MAX}(i)$, use $P_{PUCCH,c1}(i)$ as a PUCCH transmit power on the first subframe i, use $P_{PUCCH,c2}(ij)$ as a PUCCH transmit power on a second subframe ij, use $w_{c1,4}(i)\times P_{PUSCH,c1}(i)$ as a PUSCH transmit power on the first subframe i, and use $\min\{P_{PUSCH,c2}(ij), w_{c2,6}(i)\times P_{PUSCH,c2}(i)+\max\{P_{PUCCH,c1}(i), P_{PUCCH,c2}(ij)\}-P_{PUCCH,c2}(ij)\}$ as a PUSCH transmit power on the second subframe ij, so that $w_{c1,4}(i)\times P_{PUSCH,c1}(i)+w_{c2,6}(i)\times P_{PUSCH,c2}(i) \leq P_{MAX}(i)-P_{PUCCH,c1}(i)-P_{PUCCH,c2}(ij)$, where $0<w_{c1,4}(i)<1$, and $0 \leq w_{c2,6}(i)<1$.

If the first subframe transmits a PUSCH that carries UCI, and a PUSCH transmitted by the N second subframes does not carry UCI, correspondingly, the determining unit 1303 is specifically configured to:

when $P_{req\_c1}(i)+P_{req\_c2}(i)>P_{MAX}(i)$, use $P_{req\_c1}(i)$ as a transmit power on the first subframe i, use $P_{PUCCH,c2}(ij)$ as a PUCCH transmit power on a second subframe ij, and use $\min\{P_{PUSCH,c2}(ij), w_{c2,7}(i)\times P_{PUSCH,c2}(i)+\max\{P_{PUCCH,c2}(i), P_{PUCCH,c2}(ij)\}-P_{PUCCH,c2}(ij)\}$ as a PUSCH transmit power on the second subframe ij, so that $w_{c2,7}(i)\times P_{PUSCH,c2}(i) \leq P_{MAX}(i)-P_{PUCCH,c1}(i)-P_{PUCCH,c2}(i)-P_{PUSCH,c1}(i)$, where $0 \leq w_{c2,7}(i)<1$.

If at least one second subframe of the N second subframes transmits a PUSCH that carries UCI, and a PUSCH transmitted by the first subframe does not carry UCI, correspondingly, the determining unit 1303 is specifically configured to:

when $P_{req\_c1}(i)+P_{req\_c2}(i)>P_{MAX}(i)$, use $P_{PUCCH,c1}(i)$ as a PUCCH transmit power on the first subframe i, use $P_{PUCCH,c2}(ij)$ as a PUCCH transmit power on a second subframe ij, use $w_{c1,5}(i)\times P_{PUSCH,c1}(i)$ as a PUSCH transmit power on the first subframe i, and use $\min\{P_{PUSCH,c2}(ir), P'_{PUSCH,c2}(iy)+w_{c2,8}(i)\times P_{PUSCH,c2}(i)-P_{PUCCH,c2}(ir)\}$ as a PUSCH transmit power on a second subframe ir, so that $w_{c1,5}(i)\times P_{PUSCH,c1}(i)+w_{c2,8}(i)\times P_{PUSCH,c2}(i) \leq P_{MAX}(i)-P_{PUCCH,c1}(i)-P'_{PUSCH,c2}(iy)$.

$P'_{PUSCH,c2}(iy)=\max\{P_{PUSCH,c2}(iy)+P_{PUCCH,c2}(iy)\}$, $0 \leq w_{c1,5}(i) \leq 1$, $0 \leq w_{c2,8}(i)<1$, iy represents a sequence number of a second subframe that is of the N second subframes and that transmits a PUSCH that carries UCI, and ir represents a sequence number of a second subframe that is of the N second subframes and that does not transmit a PUSCH that carries UCI.

If the first subframe transmits a PUSCH that carries UCI, and at least one second subframe of the N second subframes transmits a PUSCH that carries UCI, correspondingly, the determining unit 1303 is specifically configured to:

when $P'_{PUSCH,c2}(iy)+P_{PUSCH,c1}(i)+P_{PUCCH,c1}(i)>P_{MAX}(i)$, use $w_{c1,6}(i)\times P_{PUSCH,c1}(i)$ as a PUSCH transmit power on the first subframe i, use $w_{c1,6}(i)\times P_{PUCCH,c1}(i)$ as a PUCCH transmit power on the first subframe i, and use $w_{c2,9}(iy)\times P'_{PUSCH,c2}(iy)$ as a PUSCH transmit power on a second subframe iy, so that $w_{c1,6}(i)\times P_{PUSCH,c1}(i)+w_{c1,6}(i)\times P_{PUCCH,c1}(i)+w_{c2,9}(iy)\times P'_{PUSCH,c2}(iy) \leq P_{MAX}(i)$.

$P'_{PUSCH,c2}(iy)=\max\{P_{PUSCH,c2}(iy)+P_{PUCCH,c2}(iy)\}$, $0 \leq w_{c1,6}(i)<1$, $0 \leq w_{c2,9}(iy)<1$, and iy represents a sequence number of a second subframe that is of the N second subframes and that transmits a PUSCH that carries UCI.

Optionally, in another embodiment, the determining unit 1303 is specifically configured to:

if $P_{req\_c1}(i)+P_{req\_c2}(i) \leq P_{MAX}(i)$, determine that a transmit power on the first subframe is $P_{req\_c1}(i)$, and determine that transmit powers on the N second subframes are $P_{req\_c2}(i)$;

if $P_{req\_c1}(i)+P_{req\_c2}(i)>P_{MAX}(i)$ and $P_{req\_c1}(i) \leq P_{c1}(i)$, determine that a transmit power on the first subframe is $P_{req\_c1}(i)$, and determine that transmit powers on the N second subframes are $P_{MAX}(i)-P_{req\_c1}(i)$;

if $P_{req\_c1}(i)+P_{req\_c2}(i)>P_{MAX}(i)$ and $P_{req\_c2}(i) \leq \max\{P_{c2}(i1), \ldots, P_{c2}(iN)\}$, determine that a transmit power on the first subframe is $P_{MAX}(i)-P_{req\_c2}(i)$, and determine that transmit powers on the N second subframes are $P_{req\_c2}(i)$; or if $P_{req\_c1}(i)+P_{req\_c2}(i)>P_{MAX}(i)$, $P_{req\_c1}(i)>P_{c1}(i)$, and $P_{req\_c2}(i)>\max\{P_{c2}(i1), \ldots, P_{c2}(iN)\}$, determine that a transmit power on the first subframe is $P_{c1}(i)+P_{alloc\_c1}(i)$, and determine that transmit powers on the N second subframes are $P_{MAX}(i)-P_{c1}(i)-P_{alloc\_c1}(i)$.

If a priority of the first cell is higher than a priority of the second cell, $P_{alloc\_c1}(i)$ meets that $P_{alloc\_c1}(i)=\min\{P_{MAX}(i)-\max\{P_{c2}(i1), \ldots, P_{c2}(iN)\}-P_{c1}(i), P_{req\_c1}(i)-P_{c1}(i)\}$.

If a priority of the second cell is higher than a priority of the first cell, $P_{alloc\_c1}$ meets that $P_{alloc\_c1}(i)=\min\{P_{MAX}(i)-P_{c1}(i)-\min\{P_{MAX}(i)-P_{c1}(i), P_{req\_c2}(i)\}, P_{req\_c1}(i)-P_{c1}(i)\}$.

If a priority of the first cell is the same as a priority of the second cell, $P_{alloc\_c1}(i)$ meets that $P_{alloc\_c1}(i)=\beta\times(P_{MAX}(i)-P_{c1}(i)-\max\{P_{c2}(i1), \ldots, P_{c2}(iN)\})$.

Alternatively, $P_{alloc\_c1}(i)$ meets that $$\frac{P_{alloc\_c1}(i)}{P_{MAX}(i)-P_{c1}(i)-\max\{P_{c2}(i), \ldots, P_{c2}(iN)\}-P_{alloc\_c1}(i)} = \frac{P_{req\_c1}(i)-P_{c1}(i)}{P_{req\_c2}(i)-\max\{P_{c2}(i1), \ldots, P_{c2}(iN)\}}.$$

Alternatively, $P_{alloc\_c1}$ meets that $$\frac{P_{alloc\_c1}(i)}{P_{MAX}(i) - P_{c1}(i) - \max\{P_{c2}(i1), ..., P_{c2}(iN)\} - P_{alloc\_c1}(i)} = \frac{(P_{req\_c1}(i) - P_{c1}(i))/P_{c1}(i)}{(P_{req\_c2}(i) - \max\{P_{c2}(i1), ..., P_{c2}(iN)\})/\max\{P_{c2}(i1), ..., P_{c2}(iN)\}}.$$

Alternatively, $P_{alloc\_c1}$ meets that $$\frac{P_{alloc\_c1}(i)}{P_{MAX}(i) - P_{c1}(i) - \max\{P_{c2}(i1), ..., P_{c2}(iN)\} - P_{alloc\_c1}(i)} = \frac{P_{c1}(i)}{\max\{P_{c2}(i), ..., P_{c2}(iN)\}}.$$

$P_{c1}(i)$ and $P_{c2}(ij)$ are respectively a minimum guaranteed power on the first subframe i of the first cell and a minimum guaranteed power on the second subframe ij of the second cell, β is a remaining power allocation parameter, and the remaining power allocation parameter is preconfigured or the remaining power allocation parameter is pre-obtained by the UE from the base station.

In this embodiment of this disclosure, the power indicator is determined for multiple second subframes of the second cell. When the sum of the first power requirement and the power indicator is greater than the maximum transmit power, the first power requirement and/or the second power requirement are/is adjusted, so as to ensure that an overall transmission power is not greater than the maximum transmit power, so that transmission efficiency can be ensured.

Figure 14:
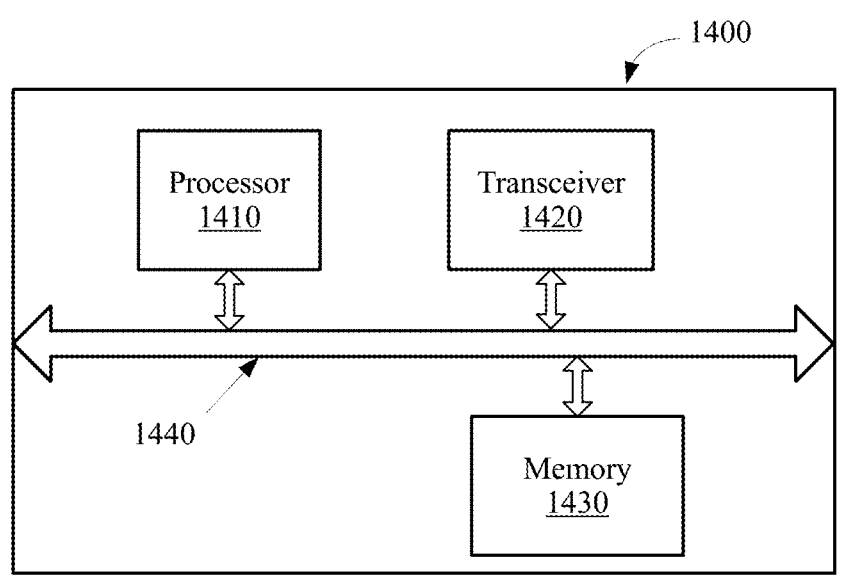
FIG. 14 is another structural block diagram of user equipment according to an embodiment of this disclosure.

It should be noted that in this embodiment of this disclosure, the first calculation unit 1301, the second calculation unit 1302, and the determining unit 1303 may be implemented by a processor. As shown in FIG. 14, UE 1400 may include a processor 1410, a transceiver 1420, and a memory 1430. The memory 1430 may be configured to store code executed by the processor 1410, and the like. The transceiver 1420 may be implemented by a transmitter, and is configured to send data according to a transmit power determined by the processor 1410.

Components in the UE 1400 are coupled together by using a bus system 1440. In addition to a data bus, the bus system 1440 further includes a power supply bus, a control bus, and a status signal bus.

The UE 1300 shown in FIG. 13 or the UE 1400 shown in FIG. 14 can implement the processes implemented by the UE in the method embodiment in FIG. 4 described above. To avoid repetition, details are not described herein again. In another embodiment of user equipment, the UE 1300 in FIG. 13 is configured with multiple cells, and a first subframe of a first cell corresponds to N second subframes of a second cell.

A first calculation unit 1301 is configured to calculate a first power requirement on the first subframe of the first cell, and calculate N second power requirements on the N second subframes of the second cell.

A determining unit 1303 is configured to determine a transmit power on the first subframe and transmit powers on the N second subframes according to a magnitude relationship between the first power requirement, the N second power requirements, and a maximum transmit power of the UE and with reference to priority information of the first cell and the second cell.

It is assumed that the first subframe corresponds to the N second subframes, the first subframe is denoted as a subframe i, the N second subframes are denoted as subframes i1, i2, . . . , and iN, the first power requirement is denoted as $P_{req\_c1}(i)$, the second power requirement is denoted as $P_{req\_c2}(ij)$, the maximum transmit power corresponding to the first subframe i is denoted as $P_{MAX}(i)$, a value range of j is 1 to N, and N is a positive integer greater than 1.

Optionally, in an embodiment, if sending of the first cell and sending of the second cell are not aligned, the determining unit 1303 is specifically configured to:

if a priority of the first cell is higher than a priority of the second cell, determine that a transmit power on a second subframe i1 sent before the first subframe i is $\min\{P_{req\_c2}(i1), P_{c2}(i1)\}$, determine that the transmit power on the first subframe i is $\min\{P_{MAX}(i) - \min\{P_{req\_c2}(i1), P_{c2}(i1)\}, P_{req\_c1}(i)\}$, and determine that a transmit power on a second subframe ik is $\min\{P_{MAX}(i) - \min\{P_{MAX}(i) - \min\{P_{req\_c2}(i1), P_{c2}(i1)\}, P_{req\_c1}(i)\}, P_{req\_c2}(ik)\}$; or if a priority of the second cell is higher than a priority of the first cell, determine that the transmit power on the first subframe i is $\min\{P_{req\_c1}(i), P_{c1}(i)\}$, determine that a transmit power on a second subframe ik is $\min\{P_{MAX}(i) - \min\{P_{req\_c1}(i), P_{c1}(i)\}, P_{req\_c2}(ik)\}$, and determine that a transmit power on a second subframe (i+1) 1 is $\min\{P_{MAX}(i+1) - P_{c1}(i+1), \min\{P_{MAX}(i) - \min\{P_{req\_c1}(i), P_{c1}(i)\}\}, P_{req\_c2}((i+1) 1)\}$.

$P_{c1}(i)$ and $P_{c2}(ij)$ are respectively a minimum guaranteed power on the first subframe i of the first cell and a minimum guaranteed power on the second subframe ij of the second cell, and a value range of k is 2 to N.

The priority information of the first cell and the second cell may be predefined. Alternatively, the priority information of the first cell and the second cell may be obtained from a base station. Correspondingly, the UE 1300 may further include an obtaining unit, configured to obtain the priority information from the base station.

Optionally, the obtaining unit may obtain priority information of the first cell from a serving base station of the first cell, and obtain priority information of the second cell from a serving base station of the second cell. For example, a priority level that is of the first cell and that is obtained by the obtaining unit from the serving base station of the first cell is 1, a priority level that is of the second cell and that is obtained from the serving base station of the second cell is 2, and the UE 1300 may determine that the priority of the first cell is higher than the priority of the second cell.

Optionally, in another embodiment, the determining unit 1303 is specifically configured to determine that the transmit powers on the second subframes are the second power requirements, and determine a transmit power on each symbol of the first subframe, so that an overall transmit power is less than or equal to the maximum transmit power.

That is, symbol-level power control may be performed on the first cell. Transmit powers used by different symbols of the first subframe may be unequal. In this way, resource utilization can be more fully improved.

Specifically, the first subframe is denoted as the subframe i, and the N second subframes are denoted as the subframes i1, i2, . . . , and iN. The determining unit 1303 is specifically configured to determine that a transmit power on a second subframe ij is $P'_{c2}(ij)$, and determine that a transmit power on a symbol that is on the first subframe i and that corresponds to the second subframe ij is $\min\{P_{c1}(i), P_{MAX}(i) - P'_{c2}(ij)\}$. $P_{c1}(i)$ is a minimum guaranteed power on the first subframe i of the first cell.

In this embodiment of this disclosure, transmit powers on the first cell and the second cell are determined according to a priority, so that transmission of a high-priority cell can be preferentially ensured, and transmission quality and transmission efficiency can be improved.

The UE 1300 shown in FIG. 13 or the UE 1400 shown in FIG. 14 can implement the processes implemented by the UE in the method embodiment in FIG. 7 described above. To avoid repetition, details are not described herein again.

It should be understood that the foregoing method embodiments of this disclosure may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logical device, a discrete gate or transistor logic device, or a discrete hardware component. It may implement or perform the methods, the steps, and logical block diagrams that are disclosed in the embodiments of this disclosure. The general purpose processor may be a microprocessor or the processor may be any normal processor, or the like. Steps of the methods disclosed with reference to the embodiments of this disclosure may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of this disclosure may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DR RAM). It should be noted that the memory of the systems and methods described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for a User equipment (UE) to determine power, wherein a user equipment UE is configured with multiple cells, a first subframe of a first cell corresponds to N second subframes of a second cell, and the method comprises:
 calculating, by the UE, a first power requirement on the first subframe, and N second power requirements on the N second subframes;
 calculating, by the UE, a power indicator on the N second subframes according to the N second power requirements; and
 determining, by the UE, transmit powers on the first subframe and the N second subframes according to a magnitude relationship between a maximum transmit power and a sum of the first power requirement and the power indicator, wherein
 the first subframe is denoted as a subframe i, the N second subframes are denoted as subframes i1, i2, . . . , and iN, the first power requirement is denoted as $P_{req\_c1}(i)$, the second power requirement is denoted as $P_{req\_c2}(ij)$, the maximum transmit power corresponding to the first subframe i is denoted as $P_{MAX}(i)$, N is a positive integer greater than 1, and a value range of j is 1 to N.

2. The method according to claim 1, wherein if at least one second subframe of the N second subframes transmits a physical uplink control channel PUCCH and/or a physical uplink shared channel PUSCH, $P_{req\_c2}(ij)$ is equal to $P_{PUCCH,c2}(ij)+P_{PUSCH,c2}(ij)$; and
 the calculating a power indicator on the N second subframes according to the N second power requirements comprises:
 denoting the power indicator as $P_{req\_c2}(i)$, and calculating the power indicator by using the following formula: $P_{req\_c2}(i)=P_{PUCCH,c2}(i)+P_{PUSCH,c2}(i)$, wherein
 $P_{PUCCH,c2}(i)$ represents a PUCCH power indicator on the N second subframes, wherein $P_{PUCCH,c2}(i)$ satisfies one of the following conditions:

$P_{PUCCH,c2}(i)=\max\{P_{PUCCH,c2}(i1),P_{PUCCH,c2}(i2), \ldots ,P_{PUCCH,c2}(iN)\};$ $P_{PUCCH,c2}(i)=\min\{P_{PUCCH,c2}(i1),P_{PUCCH,c2}(i2), \ldots ,P_{PUCCH,c2}(iN)\};$ or $P_{PUCCH,c2}(i)=\alpha \times (P_{PUCCH,c2}(i1)+P_{PUCCH,c2}(i2)+ \ldots +P_{PUCCH,c2}(iN));$ and $P_{PUSCH,c2}(i)$ represents a PUSCH power indicator on the N second subframes, wherein $P_{PUSCH,c2}(i)$ satisfies one of the following conditions:

$P_{PUSCH,c2}(i)=\max\{P_{PUSCH,c2}(i1),P_{PUSCH,c2}(i2), \ldots ,P_{PUSCH,c2}(iN)\};$ $P_{PUSCH,c2}(i)=\min\{P_{PUSCH,c2}(i1),P_{PUSCH,c2}(i2), \ldots ,P_{PUSCH,c2}(iN)\};$ or $P_{PUSCH,c2}(i)=\alpha \times (P_{PUSCH,c2}(i1)+P_{PUSCH,c2}(i2)+ \ldots +P_{PUSCH,c2}(iN)),$ wherein max represents using a maximum value, min represents using a minimum value, α is a power parameter, and the power parameter is preconfigured or the power parameter is pre-obtained by the UE from a base station.

3. The method according to claim 2, wherein the first subframe transmits a physical random access channel PRACH; and the determining transmit powers on the first subframe and the N second subframes comprises:
 if $P_{req\_c1}(i)+P_{req\_c2}(i)>P_{MAX}(i)$, using $P_{req\_c1}(i)$ as a transmit power on the first subframe i, and using $w_{c2,4}(ij) \times P_{req\_c2}(ij)$ as a transmit power on a second subframe ij, so that $P_{req\_c1}(i)+w_{c2,4}(ij) \times P_{req\_c2}(i) \leq P_{MAX}(i)$, wherein $0 \leq w_{c2,4}(ij)<1$.

4. The method according to claim 2, wherein the determining transmit powers on the first subframe and the N second subframes comprises:
 if $P_{req\_c1}(i)+P_{req\_c2}(i) \leq P_{MAX}(i)$, determining that a transmit power on the first subframe is $P_{req\_c1}(i)$, and determining that transmit powers on the N second subframes are $P_{req\_c2}(i)$;
 if $P_{req\_c1}(i)+P_{req\_c2}(i)>P_{MAX}(i)$ and $P_{req\_c1}(i) \leq P_{c1}(i)$, determining that a transmit power on the first subframe is $P_{req\_c1}(i)$, and determining that transmit powers on the N second subframes are $P_{MAX}(i)-P_{req\_c1}(i)$;
 if $P_{req\_c1}(i)+P_{req\_c2}(i)>P_{MAX}(i)$ and $P_{req\_c2}(i) \leq \max\{P_{c2}(i1), \ldots , P_{c2}(iN)\}$, determining that a transmit power on the first subframe is $P_{MAX}(i)-P_{req\_c2}(i)$, and determining that transmit powers on the N second subframes are $P_{req\_c2}(i)$; and
 if $P_{req\_c1}(i)+P_{req\_c2}(i)>P_{MAX}(i)$, $P_{req\_c1}(i)>P_{c1}(i)$, and $P_{req\_c2}(i)>\max\{P_{c2}(i1), \ldots , P_{c2}(iN)\}$, determining that a transmit power on the first subframe is $P_{c1}(i)+P_{alloc\_c1}(i)$, and determining that transmit powers on the N second subframes are $P_{MAX}(i)-P_{c1}(i)-P_{alloc\_c1}(i)$, wherein
 if a priority of the first cell is higher than a priority of the second cell, $P_{alloc\_c1}(i)$ meets that $P_{alloc\_c1}(i)=\min\{P_{MAX}(i)-\max\{P_{c2}(i1), \ldots , P_{c2}(iN)\}-P_{c1}(i), P_{req\_c1}(i)-P_{c1}(i)\};$
 if a priority of the second cell is higher than a priority of the first cell, $P_{alloc\_c1}$ meets that $P_{alloc\_c1}(i)=\min\{P_{MAX}(i)-P_{c1}(i)-\min\{P_{MAX}(i)-P_{c1}(i), P_{req\_c2}(i)\}, P_{req\_c1}(i)-P_{c1}(i)\};$ or
 if a priority of the first cell is the same as a priority of the second cell, $P_{alloc\_c1}(i)$ meets that $P_{alloc\_c1}(i)=\beta \times (P_{MAX}(i)-P_{c1}(i)-\max\{P_{c2}(i1), \ldots , P_{c2}(iN)\});$ or
 $P_{alloc\_c1}(i)$ meets that $$\frac{P_{alloc\_c1}(i)}{P_{MAX}(i)-P_{c1}(i)-\max\{P_{c2}(i1), \ldots, P_{c2}(iN)\}-P_{alloc\_c1}(i)} = \frac{P_{req\_c1}(i)-P_{c1}(i)}{P_{req\_c2}(i)-\max\{P_{c2}(i1), \ldots, P_{c2}(iN)\}}; \text{ or}$$

$P_{alloc\_c1}(i)$ meets that $$\frac{P_{alloc\_c1}(i)}{P_{MAX}(i)-P_{c1}(i)-\max\{P_{c2}(i1), \ldots, P_{c2}(iN)\}-P_{alloc\_c1}(i)} = \frac{(P_{req\_c1}(i)-P_{c1}(i))/P_{c1}(i)}{(P_{req\_c2}(i)-\max\{P_{c2}(i1), \ldots, P_{c2}(iN)\})/\max\{P_{c2}(i1), \ldots, P_{c2}(iN)\}}; \text{ or}$$

$P_{alloc\_c1}(i)$ meets that $$\frac{P_{alloc\_c1}(i)}{P_{MAX}(i)-P_{c1}(i)-\max\{P_{c2}(i1), \ldots, P_{c2}(iN)\}-P_{alloc\_c1}(i)} = \frac{P_{c1}(i)}{\max\{P_{c2}(i), \ldots, P_{c2}(iN)\}}, \text{ wherein}$$

$P_{c1}(i)$ and $P_{c2}(ij)$ are respectively a minimum guaranteed power on the first subframe i of the first cell and a minimum guaranteed power on a second subframe ij of the second cell, β is a remaining power allocation parameter, and the remaining power allocation parameter is preconfigured or the remaining power allocation parameter is pre-obtained by the UE from the base station.

5. The method according to claim 1, wherein if at least one second subframe of the N second subframes transmits a physical uplink control channel PUCCH and/or a physical uplink shared channel PUSCH, $P_{req\_c2}(ij)=P_{PUCCH,c2}(ij)+P_{PUSCH,c2}(ij)$; and the calculating a power indicator on the N second subframes according to the N second power requirements comprises:

denoting the power indicator as $P_{req\_c2}(i)$, and calculating the power indicator by using the following formula:

$$P_{req\_c2}(i)=\max \{P_{req\_c2}(i1),P_{req\_c2}(i2), \ldots ,P_{req\_c2}(iN)\}; \text{ or}$$

$$P_{req\_c2}(i)=\min\{P_{req\_c2}(i1),P_{req\_c2}(i2), \ldots ,P_{req\_c2}(iN)\}; \text{ or}$$

$$P_{req\_c2}(i)=\alpha\times(P_{req\_c2}(i1)+P_{req\_c2}(i2)+ \ldots +P_{req\_c2}(iN)), \text{ wherein}$$

max represents using a maximum value, min represents using a minimum value, α is a power parameter, and the power parameter is preconfigured or the power parameter is pre-obtained by the UE from a base station.

6. A method for a User equipment (UE) to determine power, wherein user equipment UE is configured with multiple cells, a first subframe of a first cell corresponds to N second subframes of a second cell, and the method comprises:

calculating, by the UE, a first power requirement on the first subframe of the first cell, and calculating N second power requirements on the N second subframes of the second cell; and determining a transmit power on the first subframe and transmit powers on the N second subframes according to a magnitude relationship between the first power requirement, the N second power requirements, and a maximum transmit power of the UE and with reference to priority information of the first cell and the second cell, wherein the first subframe is denoted as a subframe i, the N second subframes are denoted as subframes i1, i2, . . . , and iN, the first power requirement is denoted as $P_{req\_c1}(i)$, the second power requirement is denoted as $P_{req\_c2}(ij)$, the maximum transmit power corresponding to the first subframe i is denoted as $P_{MAX}(i)$, N is a positive integer greater than 1, and a value range of j is 1 to N.

7. The method according to claim 6, wherein:

if sending of the first cell and sending of the second cell are not aligned, the determining a transmit power on the first subframe and transmit powers on the second subframes comprises:

if a priority of the first cell is higher than a priority of the second cell, determining that a transmit power on a second subframe i1 sent before the first subframe i is $\min\{P_{req\_c2}(i1), P_{c2}(i1)\}$, determining that the transmit power on the first subframe i is $\min\{P_{MAX}(i)-\min\{P_{req\_c2}(i1), P_{c2}(i1)\}, P_{req\_c1}(i)\}$, and determining that a transmit power on a second subframe ik is $\min\{P_{MAX}(i)-\min\{P_{MAX}(i)-\min\{P_{req\_c2}(i1), P_{c2}(i1)\}, P_{req\_c1}(i)\}, P_{req\_c2}(ik)\}$; and if a priority of the second cell is higher than a priority of the first cell, determining that the transmit power on the first subframe i is $\min\{P_{req\_c1}(i), P_{c1}(i)\}$, determining that a transmit power on a second subframe ik is $\min\{P_{MAX}(i)-\min\{P_{req\_c1}(i), P_{c1}(i)\}, P_{req\_c2}(ik)\}$, and determining that a transmit power on a second subframe (i+1) 1 is $\min\{P_{MAX}(i+1)-P_{c1}(i+1), \min\{P_{MAX}(i)-\min\{P_{req\_c1}(i), P_{c1}(i)\}\}, P_{req\_c2}((i+1) 1)\}$, wherein $P_{c1}(i)$ and $P_{c2}(ij)$ are respectively a minimum guaranteed power on the first subframe i of the first cell and a minimum guaranteed power on a second subframe ij of the second cell, and a value range of k is 2 to N.

8. The method according to claim 6, wherein the first subframe is denoted as the subframe i, and the N second subframes are denoted as the subframes i1, i2, . . . , and iN; and the determining a transmit power on the first subframe and transmit powers on the second subframes comprises:

determining that a transmit power on a second subframe ij is $P'_{c2}(ij)$, and determining that a transmit power on a symbol that is on the first subframe i and that corresponds to the second subframe ij is $\min\{P_{c1}(i), P_{MAX}(i)-P'_{c2}(ij)\}$, wherein $P_{c1}(i)$ is a minimum guaranteed power on the first subframe i of the first cell.

9. A user equipment (UE), wherein the UE is configured with multiple cells, a first subframe of a first cell corresponds to N second subframes of a second cell, and the UE comprises:

a first calculation unit, configured to calculate a first power requirement on the first subframe, and calculate N second power requirements on the N second subframes;

a second calculation unit, configured to calculate a power indicator on the N second subframes according to the N second power requirements; and a determining unit, configured to determine transmit powers on the first subframe and the N second subframes according to a magnitude relationship between a maximum transmit power and a sum of the first power requirement and the power indicator, wherein the first subframe is denoted as a subframe i, the N second subframes are denoted as subframes i1, i2, . . . , and iN, the first power requirement is denoted as $P_{req\_c1}(i)$, the second power requirement is denoted as $P_{req\_c2}(ij)$, the maximum transmit power corresponding to the first subframe i is denoted as $P_{MAX}(i)$, N is a positive integer greater than 1, and a value range of j is 1 to N.

10. The user equipment according to claim 9, wherein if at least one second subframe of the N second subframes transmits a physical uplink control channel PUCCH and/or a physical uplink shared channel PUSCH, $P_{req\_c2}(ij)=P_{PUCCH,c2}(ij)+P_{PUSCH,c2}(ij)$; and the second calculation unit is specifically configured to:

denote the power indicator as $P_{req\_c2}(i)$, and calculate the power indicator by using the following formula: $P_{req\_c2}(i)=P_{PUCCH,c2}(i)+P_{PUSCH,c2}(i)$, wherein $P_{PUCCH,c2}(i)$ represents a PUCCH power indicator on the N second subframes and satisfies one of the following conditions:

$$P_{PUCCH,c2}(i)=\max \{P_{PUCCH,c2}(i1),P_{PUCCH,c2}(i2), \ldots ,P_{PUCCH,c2}(iN)\};$$

$P_{PUCCH,c2}(i)=\min\{P_{PUCCH,c2}(i1),P_{PUCCH,c2}(i2),\ldots,P_{PUCCH,c2}(iN)\}$; or $P_{PUCCH,c2}(i)=\alpha\times(P_{PUCCH,c2}(i1)+P_{PUCCH,c2}(i2)+\ldots+P_{PUCCH,c2}(iN))$; and $P_{PUSCH,c2}(i)$ represents a PUSCH power indicator on the N second subframes, and satisfies one of the following conditions:

$P_{PUSCH,c2}(i)=\max\{P_{PUSCH,c2}(i1),P_{PUSCH,c2}(i2),\ldots,P_{PUSCH,c2}(iN)\}$;

$P_{PUSCH,c2}(i)=\min\{P_{PUSCH,c2}(i1),P_{PUSCH,c2}(i2),\ldots,P_{PUSCH,c2}(iN)\}$; or $P_{PUSCH,c2}(i)=\alpha\times(P_{PUSCH,c2}(i1)+P_{PUSCH,c2}(i2)+\ldots+P_{PUSCH,c2}(iN))$, wherein max represents using a maximum value, min represents using a minimum value, $\alpha$ is a power parameter, and the power parameter is preconfigured or the power parameter is pre-obtained by the UE from a base station.

11. The user equipment according to claim 10, wherein the first subframe transmits a physical random access channel PRACH; and
the determining unit is specifically configured to:
if $P_{req\_c1}(i)+P_{req\_c2}(i)>P_{MAX}(i)$, use $P_{req\_c1}(i)$ as a transmit power on the first subframe i, and use $w_{c2,4}(ij)\times P_{req\_c2}(ij)$ as a transmit power on a second subframe ij, so that $P_{req\_c1}(i)+w_{c2,4}(ij)\times P_{req\_c2}(i)\le P_{MAX}(i)$, wherein $0\le w_{c2,4}(ij)<1$.

12. The user equipment according to claim 10, wherein the determining unit is specifically configured to:
if $P_{req\_c1}(i)+P_{req\_c2}(i)\le P_{MAX}(i)$, determine that a transmit power on the first subframe is $P_{req\_c1}(i)$, and determine that transmit powers on the N second subframes are $P_{req\_c2}(i)$;
if $P_{req\_c1}(i)+P_{req\_c2}(i)>P_{MAX}(i)$ and $P_{req\_c1}(i)\le P_{c1}(i)$, determine that a transmit power on the first subframe is $P_{req\_c1}(i)$, and determine that transmit powers on the N second subframes are $P_{MAX}(i)-P_{req\_c1}(i)$;
if $P_{req\_c1}(i)+P_{req\_c2}(i)>P_{MAX}(i)$ and $P_{req\_c2}(i)\le\max\{P_{c2}(i1),\ldots,P_{c2}(iN)\}$, determine that a transmit power on the first subframe is $P_{MAX}(i)-P_{req\_c2}(i)$, and determine that transmit powers on the N second subframes are $P_{req\_c2}(i)$; and
if $P_{req\_c1}(i)+P_{req\_c2}(i)>P_{MAX}(i)$, $P_{req\_c1}(i)>P_{c1}(i)$, and $P_{req\_c2}(i)>\max\{P_{c2}(i1),\ldots,P_{c2}(iN)\}$, determine that a transmit power on the first subframe is $P_{c1}(i)+P_{alloc\_c1}(i)$, and determine that transmit powers on the N second subframes are $P_{MAX}(i)-P_{c1}(i)-P_{alloc\_c1}(i)$, wherein
if a priority of the first cell is higher than a priority of the second cell, $P_{alloc\_c1}(i)$ meets that $P_{alloc\_c1}(i)=\min\{P_{MAX}(i)-\max\{P_{c2}(i1),\ldots,P_{c2}(iN)\}-P_{c1}(i), P_{req\_c1}(i)-P_{c1}(i)\}$;
if a priority of the second cell is higher than a priority of the first cell, $P_{alloc\_c1}$ meets that $P_{alloc\_c1}(i)=\min\{P_{MAX}(i)-P_{c1}(i)-\min\{P_{MAX}(i)-P_{c1}(i), P_{req\_c2}(i)\}, P_{req\_c1}(i)-P_{c1}(i)\}$;
if a priority of the first cell is the same as a priority of the second cell, $P_{alloc\_c1}(i)$ meets that $P_{alloc\_c1}(i)=\beta\times(P_{MAX}(i)-P_{c1}(i)-\max\{P_{c2}(i1),\ldots,P_{c2}(iN)\})$; or
$P_{alloc\_c1}(i)$ meets that $$\frac{P_{alloc\_c1}(i)}{P_{MAX}(i)-P_{c1}(i)-\max\{P_{c2}(i),\ldots,P_{c2}(iN)\}-P_{alloc\_c1}(i)}=$$

$$\frac{P_{req\_c1}(i)-P_{c1}(i)}{P_{req\_c2}(i)-\max\{P_{c2}(i1),\ldots,P_{c2}(iN)\}}; \text{ or}$$

$P_{alloc\_c1}$ meets that $$\frac{P_{alloc\_c1}(i)}{P_{MAX}(i)-P_{c1}(i)-\max\{P_{c2}(i1),\ldots,P_{c2}(iN)\}-P_{alloc\_c1}(i)}=$$

$$\frac{(P_{req\_c1}(i)-P_{c1}(i))/P_{c1}(i)}{(P_{req\_c2}(i)-\max\{P_{c2}(i1),\ldots,P_{c2}(iN)\})/\max\{P_{c2}(i1),\ldots,P_{c2}(iN)\}}; \text{ or}$$

$P_{alloc\_c1}$ meets that $$\frac{P_{alloc\_c1}(i)}{P_{MAX}(i)-P_{c1}(i)-\max\{P_{c2}(i1),\ldots,P_{c2}(iN)\}-P_{alloc\_c1}(i)}=$$

$$\frac{P_{c1}(i)}{\max\{P_{c2}(i),\ldots,P_{c2}(iN)\}}, \text{wherein}$$

$P_{c1}(i)$ and $P_{c2}(ij)$ are respectively a minimum guaranteed power on the first subframe i of the first cell and a minimum guaranteed power on a second subframe ij of the second cell, $\beta$ is a remaining power allocation parameter, and the remaining power allocation parameter is preconfigured or the remaining power allocation parameter is pre-obtained by the UE from the base station.

13. The user equipment according to claim 9, wherein if at least one second subframe of the N second subframes transmits a physical uplink control channel PUCCH and/or a physical uplink shared channel PUSCH, $P_{req\_c2}(ij)=P_{PUCCH,c2}(ij)+P_{PUSCH,c2}(ij)$; and
the second calculation unit is specifically configured to: denote the power indicator as $P_{req\_c2}(i)$, and calculate the power indicator by using one of the following formula:

$P_{req\_c2}(i)=\max\{P_{req\_c2}(i1),P_{req\_c2}(i2),\ldots,P_{req\_c2}(iN)\}$;

$P_{req\_c2}(i)=\min\{P_{req\_c2}(i1),P_{req\_c2}(i2),\ldots,P_{req\_c2}(iN)\}$; or $P_{req\_c2}(i)=\alpha\times(P_{req\_c2}(i1)+P_{req\_c2}(i2)+\ldots+P_{req\_c2}(iN))$, wherein max represents using a maximum value, min represents using a minimum value, $\alpha$ is a power parameter, and the power parameter is preconfigured or the power parameter is pre-obtained by the UE from a base station.

14. A user equipment (UE) configured to determine power, wherein the UE is configured with multiple cells, a first subframe of a first cell corresponds to N second subframes of a second cell, and the UE comprises:
a first calculation unit, configured to calculate a first power requirement on the first subframe of the first cell, and calculate N second power requirements on the N second subframes of the second cell; and
a determining unit, configured to determine a transmit power on the first subframe and transmit powers on the N second subframes according to a magnitude relationship between the first power requirement, the N second power requirements, and a maximum transmit power of the UE and with reference to priority information of the first cell and the second cell, wherein the first subframe is denoted as a subframe i, the N second subframes are denoted as subframes i1, i2, . . . , and iN, the first power requirement is denoted as $P_{req\_c1}(i)$, the second power requirement is denoted as $P_{req\_c2}(ij)$, the maximum transmit power corresponding to the first subframe i is denoted as $P_{MAX}(i)$, N is a positive integer greater than 1, and a value range of j is 1 to N.

15. The user equipment according to claim 14, wherein:
if sending of the first cell and sending of the second cell are not aligned, the determining unit is specifically configured to:
if a priority of the first cell is higher than a priority of the second cell, determine that a transmit power on a second subframe i1 sent before the first subframe i is $\min\{P_{req\_c2}(i1), P_{c2}(i1)\}$, determine that the transmit power on the first subframe i is $\min\{P_{MAX}(i)-\min\{P_{req\_c2}(i1), P_{c2}(i1)\}, P_{req\_c1}(i)\}$, and determine that a transmit power on a second subframe ik is $\min\{P_{MAX}(i)-\min\{P_{MAX}(i)-\min\{P_{req\_c2}(i1), P_{c2}(i1)\}, P_{req\_c1}(i)\}, P_{req\_c2}(ik)\}$; and
if a priority of the second cell is higher than a priority of the first cell, determine that the transmit power on the first subframe i is $\min\{P_{req\_c1}(i), P_{c1}(i)\}$, determine that a transmit power on a second subframe ik is $\min\{P_{MAX}(i)-\min\{P_{req\_c1}(i), P_{c1}(i)\}, P_{req\_c2}(ik)\}$, and determine that a transmit power on a second subframe (i+1) 1 is $\min\{P_{MAX}(i+1)-P_{c1}(i+1), \min\{P_{MAX}(i)-\min\{P_{req\_c1}(i), P_{c1}(i)\}, P_{req\_c2}((i+1)\ 1)\}$, wherein
$P_{c1}(i)$ and $P_{c2}(ij)$ are respectively a minimum guaranteed power on the first subframe i of the first cell and a minimum guaranteed power on the second subframe ij of the second cell, and a value range of k is 2 to N.

16. The user equipment according to claim 14, wherein the first subframe is denoted as the subframe i, and the N second subframes are denoted as the subframes i1, i2, . . . , and iN; and
the determining unit is specifically configured to:
determine that a transmit power on a second subframe ij is $P'_{c2}(ij)$, and determine that a transmit power on a symbol that is on the first subframe i and that corresponds to the second subframe ij is $\min\{P_{c1}(i), P_{MAX}(i)-P'_{c2}(ij)\}$, wherein
$P_{c1}(i)$ is a minimum guaranteed power on the first subframe i of the first cell.

* * * * *